US010832168B2

(12) United States Patent
Krasser et al.

(10) Patent No.: US 10,832,168 B2
(45) Date of Patent: Nov. 10, 2020

(54) COMPUTATIONAL MODELING AND CLASSIFICATION OF DATA STREAMS

(71) Applicant: CrowdStrike, Inc., Irvine, CA (US)

(72) Inventors: Sven Krasser, Los Angeles, CA (US); David Elkind, Arlington, VA (US); Patrick Crenshaw, Atlanta, GA (US); Brett Meyer, Alpharetta, GA (US)

(73) Assignee: CrowdStrike, Inc., Irvine, CA (US)

( * ) Notice: Subject to any disclaimer, the term of this patent is extended or adjusted under 35 U.S.C. 154(b) by 977 days.

(21) Appl. No.: 15/402,524

(22) Filed: Jan. 10, 2017

(65) Prior Publication Data

US 2018/0197089 A1     Jul. 12, 2018

(51) Int. Cl.
| | |
|---|---|
| *G06N 99/00* | (2019.01) |
| *H04N 21/44* | (2011.01) |
| *G06N 3/08* | (2006.01) |
| *G06F 9/00* | (2006.01) |
| *G06T 5/20* | (2006.01) |
| *G06N 20/00* | (2019.01) |

(Continued)

(52) U.S. Cl.
CPC ............ *G06N 20/00* (2019.01); *G06F 21/56* (2013.01); *G06N 3/0445* (2013.01); *G06N 3/0454* (2013.01); *G06N 3/084* (2013.01); *G06N 20/10* (2019.01); *H04L 41/145* (2013.01); *H04L 41/147* (2013.01); *H04L 63/1416* (2013.01)

(58) Field of Classification Search
CPC ...... G06N 20/00; G06N 20/10; G06N 3/0445; G06N 3/0454; G06N 3/084; G06F 21/56; H04L 41/145; H04L 41/147; H04L 63/1416

USPC ........................................................ 706/1–62
See application file for complete search history.

(56) References Cited

U.S. PATENT DOCUMENTS

| | | | |
|---|---|---|---|
| 9,589,190 B2 * | 3/2017 | Ramakrishnan ... | G06K 9/00771 |
| 2012/0233127 A1 * | 9/2012 | Solmer ............... | G06F 16/3347 |
| | | | 707/661 |

(Continued)

OTHER PUBLICATIONS

David, et al., "DeepSign: Deep Learning for Automatic Malware Signature Generation and Classification", 2015 International Joint Conference on Neural Networks (IJCNN), Jul. 1, 2015, IEEE, pp. 1-8.

(Continued)

*Primary Examiner* — Brandon S Cole
(74) *Attorney, Agent, or Firm* — Lee & Hayes, P.C.

(57) ABSTRACT

Example techniques described herein determine a signature or classification of a data stream such as a file. The classification can indicate whether the data stream is associated with malware. A processor can locate training analysis regions of training data streams based on predetermined structure data, and determining training model inputs based on the training analysis regions. The processor can determine a computational model based on the training model inputs. The computational model can receive an input vector and provide a corresponding feature vector. The processor can then locate a trial analysis region of a trial data stream based on the predetermined structure data and determine a trial model input. The processor can operate the computational model based on the trial model input to provide a trial feature vector, e.g., a signature. The processor can operate a second computational model to provide a classification based on the signature.

20 Claims, 12 Drawing Sheets

(51) Int. Cl.
H04L 12/24 (2006.01)
H04L 29/06 (2006.01)
G06F 21/56 (2013.01)
G06N 3/04 (2006.01)
G06N 20/10 (2019.01)

(56) References Cited

U.S. PATENT DOCUMENTS

| | | | |
|---|---|---|---|
| 2014/0176708 A1* | 6/2014 | Ramakrishnan | G06K 9/624 348/143 |
| 2015/0379264 A1* | 12/2015 | Alme | G06F 21/563 726/23 |
| 2016/0335432 A1 | 11/2016 | Vatamanu et al. | |
| 2016/0379112 A1 | 12/2016 | He et al. | |
| 2016/0381054 A1* | 12/2016 | Agaian | H04L 63/1408 726/23 |
| 2017/0017793 A1* | 1/2017 | Davis | G06N 3/08 |
| 2017/0083608 A1* | 3/2017 | Ye | G06N 20/00 |

OTHER PUBLICATIONS

Extended European Search Report dated Mar. 15, 2018 for European Patent Application No. 18150966.2, 8 pages.
"Autoencoder", Wikipedia, retrieved Nov. 30, 2017, from <<https://en.wikipedia.org/wiki/Autoencoder>>, 5 pages.
Baroni, et al., "Don't Count, Predict! A Systematic Comparison of Context-Counting vs. Context-Predicting Semantic Vectors", 2014, retrieved from <<http://clic.cimec.unitn.it/marco/publications/acl2014/baroni-etal-countpredict-acl2014.pdf>, 10 pages.
Bengio, et al., "A Neural Probabilistic Language Model", Journal of Machine Learning Research, 2003, 3, pp. 1137-1155.
Collobert, et al., "A Unified Architecture for Natural Language Processing: Deep Neural Networks with Multitask Learning", Proceedings fo the 25th International Conference on Machine Learning, 2008, 8 pages.
Denoising Autoencoders (dA), DeepLearning 0.1 documentation, retrieved Nov. 30, 2107 from <<http://deeplearning.net/tutorial/dA.html>>, 12 pages.
"EPScan—Entry Point Code Pattern Scanner Plugin for PEiD", Marco Pontello's Home Page, retrieved Nov. 30, 2017 from <<http://mark0.net/plugins-peid-epscan-e.html>>, 2 pages.
"Executable and Linkable Format", Wikipedia, retrieved Nov. 30, 2017, from <<https://en.wikipedia.org/wiki/Executable_and_Linkable_Format>>, 13 pages.
"File: Portable Executable 32 bit Structure in SVG fixed.svg", Wikimedia Commons, Sep. 1, 2016, retrieved from <<https://commons.wikimedia.org/wiki/File:Portable_Executable_32_bit_Structure_in_SVG_fixed.svg>>, 4 pages.
"file(1)—Linux man page", Oct. 9, 2008, retrieved from <<https://linux.die.net/man/1/file>>, 10 pages.
Gensim, models.doc2vec—Deep learning with paragraph2vec, Oct. 5, 2014, retrieved from <<https://radimrehurek.com/gensim/models/doc2vec.html>>, 8 pages.
Hyvarinen, et al., "Independent Component Analysis: Algorithms and Applications", retrieved Dec. 21, 2016 from <<http://mlsp.cs.cmu.edu/courses/fall2012/lectures/ICA_Hyvarinen.pdf>>, 31 pages.
Le, et al., "Distributed Representations of Sentences and Documents", Proceedings of the 31st International Conference on Machine Learning, 2014, 9 pages.
"Loss Functions for Classification", Wikipedia, retrieved Nov. 30, 2017 from <<https://en.wikipedia.org/wiki/Loss_functions_for_classification>>, 5 pages.
"magic(5)—Linux man page", Aug. 30, 2008, retrieved from <<https://linux.die.net/man/5/magic>>, 8 pages.
Mikolov, et al., "Distributed Representation of Words and Phrases and their Compositionality", 2013 retrieved Nov. 30, 2017, from <<http://papers.nips.cc/paper/5021-distributed-representations-of-words-and-phrases-and-their-compositionality.pdf>>, 9 pages.
Mikolov, et al., "Efficient Estimation of Word Representations in Vector Space", retrieved Nov. 14, 2016 from <<https://arxiv.org/pdf/1301.3781v3.pdf >>, Sep. 7, 2013, 12 pages.
"NLP 05: From Word2vec to Doc2vec: a simple example with Gensim", Cafe, bonne nuit, Jul. 27, 2016, from <<https://ireneli.eu/2016/07/27/nlp-05-from-word2vec-to-doc2vec-a-simple-example-with-gensim/>>, 29 pages.
"One-hot", Wikipedia, retrieved Jan. 31, 2017 from <<https://en.wikipedia.org/wiki/One-hot>>, 3 pages.
"PEid", Aldeid, retrieved Nov. 30, 2017 from <<https://www.aldeid.com/wiki/PEiD>>, 6 pages.
Pietrek M., Peering Inside the PE A Tour of the Win32 Portable Executable File Format , Debugging and Error Handling Technical Articles, Mar. 1994, 32 pages.
"Portable Executable", Wikipedia, retrieved Nov. 30, 2017 from <<https://en.wikipedia.org/wiki/Portable_Executable>>, 5 pages.
Ruder, S., "On Word Embeddings—Part 1", retrieved Nov. 30, 2017 from <<http://ruder.io/word-embeddings-1/index.html>>, 17 pages.
Ruder. S., "On Word Embeddings—Part 2: Approximating the Softmax", retrieved Nov. 30, 2017 from <<http://ruder.io/word-embeddings-softmax/>>, 22 pages.
"Stacked Denoising Autoencoders (SdA)", DeepLearning 0.1 documentation, retrieved Jan. 31, 2017 from <<http:deeplarning.et/tutorial/SdA.html>>, 7 pages.
"TrID—File Identifier", Marco Pontello's Home Page, retrieved Nov. 30, 2017 from <<http://mark0.net/soft-trid-e.html>>, 4 pages.
"Tridscan.py" Marco Pontello, dated Apr. 18, 2016, retrieved Nov. 10, 2016 from <<http://mark0.net/download/tridscan.zip>>, pp. 2, 3, 5, and 6.
"Unsupervised Learning", Wikipedia, retrieved Jan. 31, 2017 from <<https://en.wikipedia.org/wiki/Unsupervised_learning>>, 4 pages.
"UPX", Wikipedia, retrieved Nov. 30, 2017 from <<https://en.wikipedia.org/wiki/UPX>>, 3 pages.
"Vector Representations of Words", TensorFlow, retrieved Jan. 31, 2017, from <<https://www.tensorflow.org/tutorials/word2vec>>, 12 pages.
"Vector Space Model", Wikipedia, retrieved Nov. 30, 2017 from <<https://en.wikipedia.org/wiki/Vector_space_model>>, 4 pages.
Vincent, et al., "Stacked Denoising Autoencoder: Learning Useful Representations in a Deep Network with a Local Denoising Criterion", Journal of Machine Learning Research, 2010, 11, pp. 3371-3408.
European Office Action dated Jul. 13, 2020 for European Patent Application No. 18150966.2, a counterpart foreign application of the U.S. Appl. No. 15/402,524, 6 pages.

* cited by examiner

COMPUTATIONAL MODELING AND CLASSIFICATION OF DATA STREAMS

BACKGROUND

With computer and Internet use forming an ever greater part of day to day life, security exploits and cyber attacks directed to stealing and destroying computer resources, data, and private information are becoming an increasing problem. For example, "malware", or malicious software, is a general term used to refer to a variety of forms of hostile or intrusive computer programs. Malware is used, for example, by cyber attackers to disrupt computer operations, to access and to steal sensitive information stored on the computer or provided to the computer by a user, or to perform other actions that are harmful to the computer and/or to the user of the computer. Malware may include computer viruses, worms, Trojan horses, ransomware, rootkits, keyloggers, spyware, adware, rogue security software, potentially unwanted programs (PUPs), potentially unwanted applications (PUAs), and other malicious programs. Malware may be formatted as executable files (e.g., COM or EXE files), dynamic link libraries (DLLs), scripts, steganographic encodings within media files such as images, and/or other types of computer programs, or combinations thereof.

Malware authors or distributors ("adversaries") frequently disguise or obfuscate malware in attempts to evade detection by malware-detection or -removal tools. Consequently, it is time consuming to determine if a program is malware and, if so, to determine the harmful actions the malware performs without actually running the malware.

Throughout this document, hexadecimal values are prefixed with "0x" and C-style backslash escapes are used for special characters within strings.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

Figure 1:
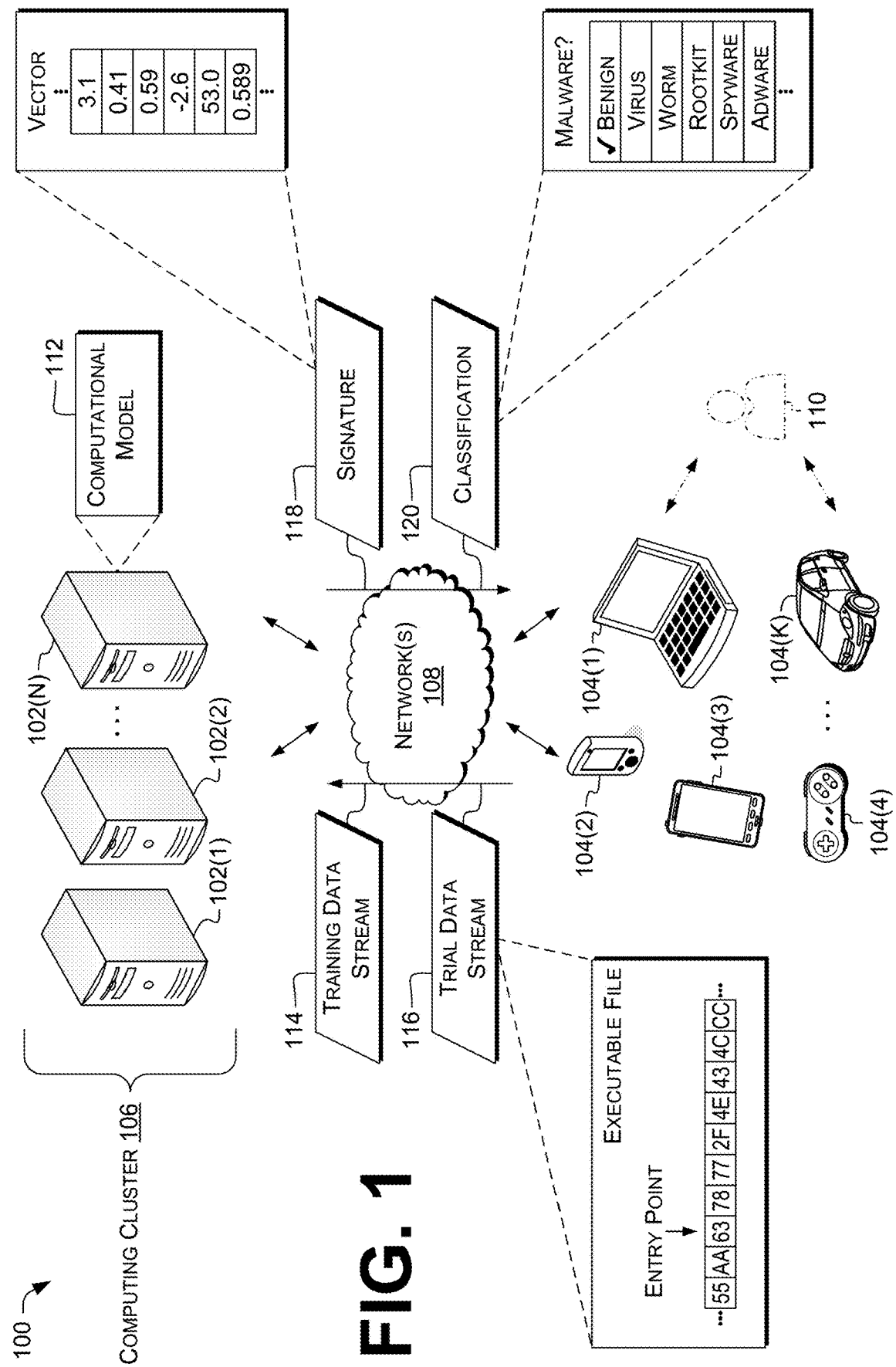
FIG. 1 is a block diagram depicting example scenarios for determining and operating computational models as described herein.

Some examples herein relate to detection or classification of malware, e.g., concealed malware. Some examples herein relate to fingerprinting or signature determination of files (or other data streams, and likewise throughout this discussion), e.g., for use in classifying those files. Fingerprinting can include, e.g., determining a collection of values that represent the classification in a way independent of the specific file. Classifications can include, e.g., malware vs. non-malware, or what type of malware. Some examples relate to determining representations of files that permit automatically grouping multiple files or identifying common characteristics of multiple files.

Malware programs and other files are often prepared by or using various software tools, referred to herein for brevity as "generators." Generator processing can remove or change characteristics of a file, e.g., by modifying headers or removing markers commonly found in a non-processed file. Examples herein can permit determining which generator(s) were used in processing a particular file, which can then permit undoing the effect of the generator or otherwise rendering the file more susceptible to analysis. Example generators can include compilers, linkers, librarians, or other software-development tools useful in preparing computer-executable instructions ("code"); packers, encryptors, or other code-obfuscation tools; or installation, copy-protection, archiving, or self-extractor generation tools useful in packaging the executable code into an executable file or in assembling an executable file from components. Some examples of generators are discussed below.

Various schemes exist for identifying filetypes, e.g., by determining a generator that was used to prepare a package. Some such schemes use a library of patterns, e.g., of byte values, characteristic of a particular type of file. For example, DOS and WINDOWS executables begin with "MZ", PKZIP archives begin with "PK", and interpretable scripts on UNIX-like platforms typically begin with "#!". Such schemes are implemented by, e.g., pefile, PEiD, TrID, and file(1). Patterns can include, e.g., wildcards, regular expressions, or other techniques for handling variation. For example, a file beginning with "MZ", having the four bytes "PE\0\0" somewhere in the first one kilobyte of the file, and having the magic number 0x010B located 24 bytes after the beginning of the "PE\0\0", is likely a WINDOWS NT executable. A pattern can represent this sequence of conditions.

However, the number of recognizable patterns in software is large and growing. For example, a common PEiD database can contain thousands of patterns. Maintaining a current database of patterns therefore requires continual, time-consuming effort. Moreover, the quality of a pattern database is limited by the amount of data available. Patterns can be prepared by security analysts, given access to particular generators or samples of the files those generators output. Patterns can additionally or alternatively be prepared by automatically correlating numerous samples of the output of a particular generator. However, authors both of malware and of legitimate generators frequently change or update their software, so finding enough samples of a particular generator's output to derive a reliable pattern can be difficult.

Some examples herein determine a signature of a data stream including data stored in, e.g., a file, a disk boot sector or partition root sector, or a block of memory. The signature can indicate which generator was used in preparing the data stream. The signature can additionally or alternatively indicate characteristics of the data stream, so that the degree of similarity between the signatures of two streams is positively correlated with the likelihood that those two files were prepared using the same generator. Some examples herein use a computational model instead of a fixed database, such as PEiD's database; other examples use a computational model in addition to a fixed database. Using a computational model can provide increased flexibility and accuracy of analysis and classification. Some examples (e.g., using auto-encoders) herein can automatically train the computational model in an unsupervised manner, which can significantly reduce the amount of time and data required to prepare the computational model compared to schemes requiring human analysis of sample data streams.

While example techniques described herein may refer to analyzing a program that may potentially be malware, it is understood that the techniques may also apply to other non-malicious software that includes code obfuscation or other transformation performed by a generator. For example, a web server application may include code obfuscation to make it more difficult to locate security vulnerabilities in the code of the web server application. A digital video player may include code obfuscation to make it more difficult to reverse engineer a video decoding process. A commercial software product may include code obfuscation to protect its serial number algorithm so that it is more difficult for a software pirate to generate registration numbers for free. A cryptographic software product may include code obfuscation to hide a cryptographic algorithm. Accordingly, analysis of data streams discussed herein may be used by anti-malware security researchers, white-hat vulnerability researchers, interoperability developers, anti-piracy testers or other analysts of data streams. The above examples are not limiting; not all generators obfuscate their inputs. It can be useful for security, classification, or other program analysis to determine what the generator of a file was, e.g., using techniques described herein.

Various entities, configurations of electronic devices, and methods for determining and operating computational models, e.g., for stream-analysis or malware-detection applications, are described herein. While many examples described herein relate to servers and other non-consumer electronic devices, other types of electronic devices can be used, e.g., as discussed with reference to FIG. 1. References throughout this document to "users" can refer to human users or to other entities interacting with a computing system.

Illustrative Environment

FIG. 1 shows an example scenario 100 in which examples of computational-model-based systems can operate and/or in which computational-model determination and/or use methods such as those described herein can be performed. Illustrated devices and/or components of scenario 100 include computing device(s) 102(1)-102(N) (individually and/or collectively referred to herein with reference 102), where N is any integer greater than and/or equal to 1, and computing devices 104(1)-104(K) (individually and/or collectively referred to herein with reference 104), where K is any integer greater than and/or equal to 1. In some examples, N=K; in other examples, N>K or N<K. Although illustrated as, e.g., desktop computers, laptop computers, tablet computers, and/or cellular phones, computing device(s) 102 and/or 104 can include a diverse variety of device categories, classes, and/or types and are not limited to a particular type of device.

In the illustrated example, computing device(s) 102(1)-102(N) can be computing nodes in a cluster computing system 106, e.g., a cloud service such as GOOGLE CLOUD PLATFORM or another cluster computing system ("computing cluster" or "cluster") having several discrete computing nodes (device(s) 102) that work together to accomplish a computing task assigned to the cluster as a whole. In some examples, computing device(s) 104 can be clients of cluster 106 and can submit jobs to cluster 106 and/or receive job results from cluster 106. Computing devices 102(1)-102(N) in cluster 106 can, e.g., share resources, balance load, increase performance, and/or provide fail-over support and/or redundancy. Computing devices 104 can additionally or alternatively operate in a cluster and/or grouped configuration. In the illustrated example, computing devices 104 communicate with computing devices 102. Additionally or alternatively, computing devices 104 can communicate with cluster 106, e.g., with a load-balancing or job-coordination device of cluster 106, and cluster 106 or components thereof can route transmissions to individual computing devices 102.

Some cluster-based systems can have all or a portion of the cluster deployed in the cloud. Cloud computing allows for computing resources to be provided as services rather than a deliverable product. For example, in a cloud-computing environment, resources such as computing power, software, information, and/or network connectivity are provided (for example, through a rental agreement) over a network, such as the Internet. As used herein, the term "computing" used with reference to computing clusters, nodes, and jobs refers generally to computation, data manipulation, and/or other programmatically-controlled operations. The term "resource" used with reference to clusters, nodes, and jobs refers generally to any commodity and/or service provided by the cluster for use by jobs. Resources can include processor cycles, disk space, random-access memory (RAM) space, network bandwidth (uplink, downlink, or both), prioritized network channels such as those used for communications with quality-of-service (QoS) guarantees, backup tape space and/or mounting/unmounting services, electrical power, etc. Cloud resources can be provided for internal use within an organization or for sale to outside customers. In some examples, computer security service providers can operate computing cluster 106, or can operate or subscribe to a cloud service providing computing resources.

In some examples, as indicated, computing device(s), e.g., computing devices 102(1) and 104(1), can intercommunicate to participate in and/or carry out computational-model determination and/or operation as described herein. For example, computing device 104(1) can be or include a data source owned or operated by or on behalf of a user, and computing device 102(1) can be a computational-model determination and operation system, as described below.

Different devices and/or types of computing devices 102 and 104 can have different needs and/or ways of interacting with cluster 106. For example, computing devices 104 can interact with cluster 106 with discrete request/response communications, e.g., for queries and responses using an already-determined computational model. Additionally and/or alternatively, computing devices 104 can be data sources and can interact with cluster 106 with discrete and/or ongoing transmissions of data to be used as input to a computational model or a process of determining a computational model. For example, a data source in a personal computing device 104(1) can provide to cluster 106 data of newly-installed executable files, e.g., after installation and before execution of those files. This can provide improved accuracy of outputs of a computational model (CM), e.g., a malware-detection CM, by increasing the amount of data input to the CM. Additionally and/or alternatively, computing devices 104 can be data sinks and can interact with cluster 106 with discrete and/or ongoing requests for data output from a computational model, e.g., updates to firewall or routing rules based on changing network conditions.

In some examples, computing devices 102 and/or 104 can communicate with each other and/or with other computing devices via one or more network(s) 108. In some examples, computing devices 102 and 104 can communicate with external devices via network(s) 108. For example, network(s) 108 can include public networks such as the Internet, private networks such as an institutional and/or personal intranet, and/or combination(s) of private and public networks. Communications between computing devices 102 and/or 104 via network(s) 108 can be structured, e.g., according to defined application programming interfaces (APIs). For example, data can be retrieved via network(s) 108, e.g., using a Hypertext Transfer Protocol (HTTP) request such as a GET to a Web Services and/or Representational State Transfer (REST) API endpoint. Remote Procedure Call (RPC) APIs or other types of APIs can additionally or alternatively be used for network communications.

In some examples, computing devices 102 and/or 104, e.g., laptops, smartphones, and/or other computing devices 102 and/or 104 described herein, interact with an entity 110 (shown in phantom). The entity 110 can include systems, devices, parties such as users, and/or other features with which computing devices 102 and/or 104 can interact. For brevity, examples of entity 110 are discussed herein with reference to users of a computing system; however, these examples are not limiting. In some examples, computing device 104 is operated by entity 110, e.g., a user. In some examples, computing devices 102 operate computational model(s) to determine a model output corresponding to a file on a user's computing device 104, and transmit an indication of the model output via network 108 to the computing device 104, e.g., a smartphone. The computing device 104 can, e.g., present information of the model output to entity 110. Examples of this process are discussed in more detail below with reference to at least FIGS. 3, 4, 7, and 8.

Computing device(s) 102 can store one or more computational model(s) (CMs) 112, individually and/or collectively referred to herein with reference 112. In some examples, algorithms for determining or operating computational model(s) 112 as described herein can be performed on a computing device (e.g., computing device 102), such as a smart phone, a tablet, a desktop computer, a server, a server blade, a supercomputer, etc. The resulting models can be used on such computing devices and/or on computing devices (e.g., computing device 104) having one or more input devices, such as a physical keyboard, a soft keyboard, a touch screen, a touch pad, microphone(s), and/or camera(s). In some examples, functions described herein can be shared between one or more computing device(s) 102 and one or more computing device(s) 104. For example, the computing device(s) 102 can determine a computational model 112 initially and the computing device(s) 104 can perform incremental updating of the computational model 112.

In various examples, e.g., of computational model(s) 112 for determining signatures of files, classifying files, determining whether files contain malware, or other use cases noted herein, the computational model(s) 112 may include, but are not limited to, multilayer perceptrons (MLPs), neural networks (NNs), gradient-boosted NNs, deep neural networks (DNNs), recurrent neural networks (RNNs) such as long short-term memory (LSTM) networks or Gated Recurrent Unit (GRU) networks, decision trees, decision forests, autoencoders (e.g., denoising autoencoders such as stacked denoising autoencoders), Bayesian networks, support vector machines (SVMs), or hidden Markov models (HMNIs). The computational models 112 can include parameters governing or affecting the output of the computational model 112 for a particular input. Parameters can include, but are not limited to, e.g., per-neuron, per-input weight or bias values, activation-function selections, node weights, edge weights, or other data values. A training module 226, FIG. 2, can be configured to determine CMs 112, e.g., to determine values of parameters in computational models 112. For example, CMs 112 can be determined using an iterative update rule such as gradient descent (e.g., stochastic gradient descent or AdaGrad) with backpropagation.

The computing device(s) 102 can be configured to use the determined parameter values of computational model(s) 112 to, e.g., categorize a file with respect to malware type, and/or to perform other data analysis and/or processing. In some examples, the computing device 104 can be configured to communicate with computing device(s) 102 to operate a computational model 112. For example, the computing device 104 can transmit a request to computing device(s) 102 for an output of the computational model(s) 112, receive a response, and take action based on that response. In some examples, the computing device 104 can provide to entity 110 information included in the response, or can quarantine or delete file(s) indicated in the response as being associated with malware.

In the illustrated example, computing device(s) 104 provide data streams (or portions thereof, and likewise throughout this document) to computing device(s) 102. The illustrated data streams include training data stream 114 and trial data stream 116. Although only one of each stream 114 and 116 is shown, multiple of either can be used. The computing device(s) 102 can determine or operate CM 112 based at least in part on the stream(s) 114 and 116. The computing device(s) 102 can provide to computing device(s) 104 a signature 118, a classification 120, or other outputs of CM 112. In some examples, at least one of, or all of, the training data stream(s) 114 or trial data stream(s) can comprise or consist of the partial or full contents of respective digital files, e.g., executable files, data files, or system files. In some examples, training data stream 114 can be used in determining CM 112, and CM 112 can be operated to determine whether trial data stream 116 is associated with malware.

In the illustrated example, trial data stream 116 includes bytes of an executable file ("EXE"), e.g., a WINDOWS Portable Executable (PE)-format file. The specific illustrated form and contents of the executable file are provided for clarity of explanation, and are not limiting. The illustrated executable file has an entry point at which execution begins after, e.g., an operating system loads the executable file into memory. Illustrated are two bytes of the file before the entry point, the byte at the entry point, and seven bytes after the byte at the entry point. Trial data stream 116 can include any number of bytes of the executable file, e.g., ten (or another number of) bytes beginning with the byte at the entry point. Analyzing bytes beginning with or shortly after the entry point, in the illustrated nonlimiting example, can permit identifying characteristics of generator(s) used in preparing the executable file, since such generators often embed specific code sequences in the files they output.

In some examples, data streams 114 and 116 have the same format (although this is not required). Moreover, in some examples, computational model 112 can perform the same processing on a training data stream 114 as on a trial data stream 116. Accordingly, discussion herein of formats or processing of trial data stream 116 can additionally or alternatively apply to training data stream 114, and vice versa, unless otherwise expressly specified.

In the illustrated example, the signature 118 includes a vector of numerical values, shown as real numbers, although at least some of the numerical values can additionally or alternatively be fractions, integers, imaginary numbers, complex numbers, or other numerical values. The numerical values can be or include feature values, e.g., representing the contents or structure of the data in the data stream 116. In some examples, the values can be between zero and unity, or at least zero, or at most zero, or unrestricted. The values can be stored in various formats, including two's-complement or sign-magnitude integers or IEEE-754 four-byte ("single") or eight-byte ("double") floating point formats. The term "float value," as used herein, can refer to a value formatted as a single, double, or any other floating-point format.

In the illustrated example, the classification 120 includes a bitmask, attribute list, or other representation of categories to which the trial data stream 116 belongs, as determined by CM 112. For example, classification 120 can include a Boolean value indicating whether or not trial data stream 116 is associated with malware, or an enumerated value indicating with which of several categories trial data stream 116 is associated (e.g., "benign," "virus," or "spyware"). Classification 120 can additionally or alternatively include one or more confidence values or other values indicating the likelihood of a classification, e.g., a "spyware" value of 0.42 indicating a 42% likelihood that the sample is spyware. In an example, classification 120 can include multiple confidence values for respective categories of malware (e.g., "spyware=0.42; worm=0.05").

A data stream 114 or 116, e.g., output by a generator, can be associated with malware if, e.g., the data stream is itself malicious code, is (or is likely) at least a portion of a grouping of malicious code, or is output by a generator commonly used for generating malware. For example, a data stream 114 or 116 may include a decruncher that decompresses data from a file into RAM. A decruncher itself may be entirely benign, as may be the compressed data. However, the data, once decompressed, may be or include executable code of a malicious program, dynamic-link library (DLL), or other computer-executable module. Accordingly, a decruncher commonly used to compress malicious code, or compressed malicious code itself, can be associated with malware, as indicated by the classification 120. Some generators are used for malware, and are also used for legitimate software. A determination that a data stream is associated with malware does not necessarily require or guarantee that the data stream in fact be malware. In some examples, classification 120, discussed below, can be used by a security analyst in triaging data streams, and can permit the security analyst to readily separate data streams based on a likelihood they are in fact malware.

By way of example and not limitation, computing device(s) 102 and/or 104 can include, but are not limited to, server computers and/or blade servers such as Web servers, map/reduce servers and/or other computation engines, and/or network-attached-storage units (e.g., 102(1)), laptop computers, thin clients, terminals, and/or other mobile computers (e.g., 104(1)), wearable computers such as smart watches and/or biometric and/or medical sensors, implanted computing devices such as biometric and/or medical sensors, computer navigation client computing devices, satellite-based navigation system devices including global positioning system (GPS) devices and/or other satellite-based navigation system devices, personal data assistants (PDAs), and/or other specialized portable electronic devices (e.g., 104(2)), tablet computers, tablet hybrid computers, smartphones, mobile phones, mobile phone-tablet hybrid devices, and/or other telecommunication devices (e.g., 104(3)), portable and/or console-based gaming devices and/or other entertainment devices such as network-enabled televisions, set-top boxes, media players, cameras, and/or personal video recorders (PVRs) (e.g., 104(4), depicted as a gamepad), automotive computers such as vehicle control systems, vehicle security systems, and/or electronic keys for vehicles (e.g., 104(K), depicted as an automobile), desktop computers, and/or integrated components for inclusion in computing devices, appliances, and/or other computing device(s) configured to participate in and/or carry out computational-model determination and/or operation as described herein, e.g., for file-analysis or malware-detection purposes.

Network(s) 108 can include any type of wired and/or wireless network, including but not limited to local area networks (LANs), wide area networks (WANs), satellite networks, cable networks, Wi-Fi networks, WiMAX networks, mobile communications networks (e.g., 3G, 4G, and so forth) and/or any combination thereof. Network(s) 108 can utilize communications protocols, such as, for example, packet-based and/or datagram-based protocols such as Internet Protocol (IP), Transmission Control Protocol (TCP), User Datagram Protocol (UDP), other types of protocols, and/or combinations thereof. Moreover, network(s) 108 can also include a number of devices that facilitate network communications and/or form a hardware infrastructure for the networks, such as switches, routers, gateways, access points, firewalls, base stations, repeaters, backbone devices, and the like. Network(s) 108 can also include devices that facilitate communications between computing devices 102 and/or 104 using bus protocols of various topologies, e.g., crossbar switches, INFINIBAND switches, and/or FIBRE CHANNEL switches and/or hubs.

In some examples, network(s) 108 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, and/or WiMAX.

As noted above, network(s) 108 can include public network(s) or private network(s). Example private networks can include isolated networks not connected with other networks, such as MODBUS, FIELDBUS, and/or Industrial Ethernet networks used internally to factories for machine automation. Private networks can also include networks connected to the Internet and/or other public network(s) via network address translation (NAT) devices, firewalls, network intrusion detection systems, and/or other devices that restrict and/or control the types of network packets permitted to flow between the private network and the public network(s).

Different networks have different characteristics, e.g., bandwidth or latency, and for wireless networks, accessibility (open, announced but secured, and/or not announced), and/or coverage area. The type of network 108 used for any given connection between, e.g., a computing device 104 and cluster 106 can be selected based on these characteristics and on the type of interaction, e.g., ongoing streaming or intermittent request-response communications.

Illustrative Configurations

Figure 2:
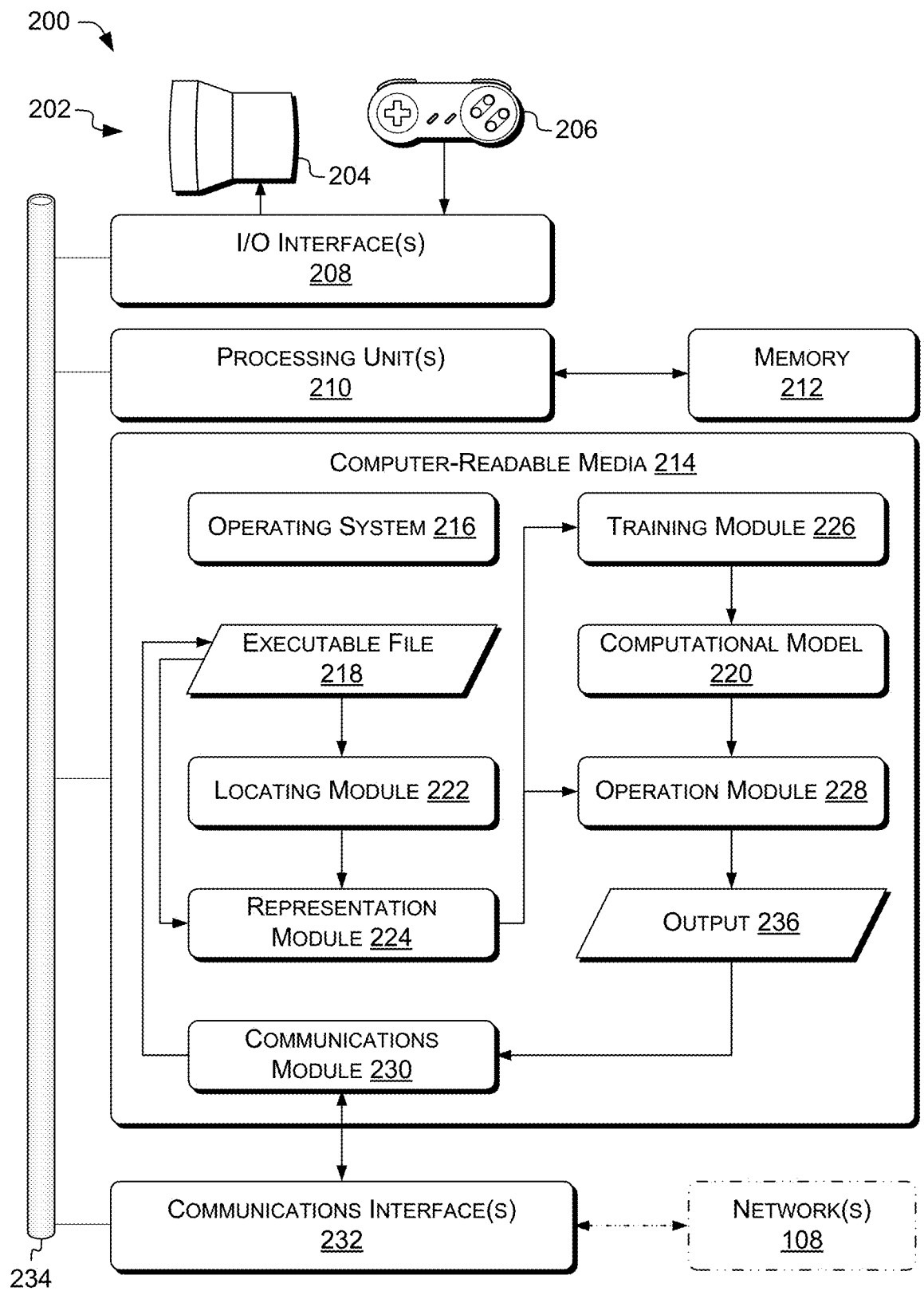
FIG. 2 is a block diagram depicting an example computing device configured to participate in determining or operating computational model(s) according to various examples described herein.

FIG. 2 is an illustrative diagram that shows example components of a computing device 200, which can represent computing device(s) 102 and/or 104, and which can be and/or implement a computational-model determination and/or operation system, device, and/or apparatus, according to various examples described herein. Computing device 200 can include and/or be included in a system and/or device for determining and/or operating a computational model as described herein.

Computing device 200 can include and/or be connected to a user interface 202. In some examples, user interface 202 can be configured to permit a user, e.g., entity 110 and/or a CM administrator, to operate the CM 112, or to control and/or otherwise interact with cluster 106 and/or computing devices 102 therein. Accordingly, actions such as presenting information of or corresponding to an output of a CM 112 to entity 110 can be taken via user interface 202.

In some examples, user interface 202 can include various types of output devices configured for communication to a user and/or to another computing device 200. Output devices can be integral and/or peripheral to computing device 200. Examples of output devices can include a display 204, a printer, audio speakers, beepers, and/or other audio output devices, a vibration motor, linear vibrator, and/or other haptic output device, and the like. Display 204 can include an organic light-emitting-diode (OLED) display, a liquid-crystal display (LCD), a cathode-ray tube (CRT), and/or another type of visual display. Display 204 can be a component of a touchscreen, and/or can include a touchscreen.

User interface 202 can include a user-operable input device 206 (depicted as a gamepad). User-operable input device 206 can include one or more input devices, integral and/or peripheral to computing device 200. The input devices can be user-operable, and/or can be configured for input from other computing device 200. Examples of input devices can include, e.g., a keyboard, keypad, a mouse, a trackball, a pen sensor and/or smart pen, a light pen and/or light gun, a game controller such as a joystick and/or game pad, a voice input device such as a microphone, voice-recognition device, and/or speech-recognition device, a touch input device such as a touchscreen, a gestural and/or motion input device such as a depth camera, a grip sensor, an accelerometer, another haptic input, a visual input device such as one or more cameras and/or image sensors, and the like. User queries can be received, e.g., from entity 110, via user interface 202.

Computing device 200 can further include one or more input/output (I/O) interface(s) 208 to allow computing device 200 to communicate with input, output, and/or I/O devices (for clarity, some not depicted). Examples of such devices can include components of user interface 202 such as user-operable input devices and output devices described above. Other examples of such devices can include power meters, accelerometers, and other devices for measuring properties of entity 110, computing device 200, and/or another computing device 102 and/or 104. Computing device 200 can communicate via I/O interface 208 with suitable devices and/or using suitable electronic/software interaction methods. Input data, e.g., of user inputs on user-operable input device 206, can be received via I/O interface 208 (e.g., one or more I/O interface(s)). Output data, e.g., of user interface screens, can be provided via I/O interface 208 to display 204, e.g., for viewing by a user.

The computing device 200 can include one or more processing unit(s) 210. In some examples, processing unit(s) 210 can include and/or be connected to a memory 212, e.g., a RAM and/or cache. Processing units 210 can be operably coupled to the I/O interface 208 and to at least one computer-readable media 214 (CRM), e.g., a tangible non-transitory computer-readable medium.

Processing unit(s) 210 can be and/or include one or more single-core processors, multi-core processors, CPUs, GPUs, GPGPUs, and/or hardware logic components configured, e.g., via specialized programming from modules and/or APIs, to perform functions described herein. For example, and without limitation, illustrative types of hardware logic components that can be used in and/or as processing units 210 include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, processing unit(s) 210 can represent a hybrid device, such as a device from ALTERA and/or XILINX that includes a CPU core embedded in an FPGA fabric. These and/or other hardware logic components can operate independently and/or, in some instances, can be driven by a CPU. In some examples, at least some of computing device(s) 102 and/or 104, FIG. 1, can include a plurality of processing units 210 of multiple types. For example, the processing units 210 in computing device 102(N) can be a combination of one or more GPGPUs and one or more FPGAs. Different processing units 210 can have different execution models, e.g., as is the case for graphics processing units (GPUs) and central processing unit (CPUs). In some examples at least one processing unit 210, e.g., a CPU, graphics processing unit (GPU), and/or hardware logic device, can be incorporated in computing device 200, while in some examples at least one processing unit 210, e.g., one or more of a CPU, GPU, and/or hardware logic device, can be external to computing device 200.

Computer-readable media described herein, e.g., CRM 214, includes computer storage media and/or communication media. Computer storage media includes tangible storage units such as volatile memory, nonvolatile memory, and/or other persistent and/or auxiliary computer storage media, removable and non-removable computer storage media implemented in any method and/or technology for storage of information such as computer-readable instructions, data structures, program modules, and/or other data. Computer storage media includes tangible and/or physical forms of media included in a device and/or hardware component that is part of a device and/or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards and/or other optical storage media, magnetic cassettes, magnetic tape, magnetic disk storage, magnetic cards and/or other magnetic storage devices and/or media, solid-state memory devices, storage arrays, network attached storage, storage area networks, hosted computer storage and/or memories, storage, devices, and/or storage media that can be used to store and maintain information for access by a computing device 200.

In contrast to computer storage media, communication media can embody computer-readable instructions, data structures, program modules, and/or other data in a modulated data signal, such as a carrier wave, and/or other transmission mechanism. As defined herein, computer storage media does not include communication media.

In some examples, CRM 214 can store instructions executable by the processing unit(s) 210, and/or instructions executable by external processing units such as by an external central processing unit (CPU) and/or external processor of any type discussed herein. Any of these instructions are referred to herein as computer-executable instructions or processor-executable instructions. For example, CRM 214 can store instructions of an operating system 216. CRM 214 can additionally or alternatively store at least one executable file 218, which can represent trial data stream 116. Executable file 218 represents any file comprising computer-executable instructions, even if those instructions are compressed, encrypted, or otherwise obfuscated. In some examples, executable file 218 comprises at least one header or other information usable by a loader (e.g., a loading routine such as UNIX/POSIX exec(2)) in loading the computer-executable instructions from executable file 218 into a RAM or other high-speed memory, or in otherwise preparing computer-executable instructions from executable file 218 for execution by processing unit(s) 210. In the illustrated example, the loader is a component of the operating system 216, although some examples, e.g., bare-metal embedded-systems configurations, can include a loader but not an operating system 216. Examples herein are discussed with reference to executable file 218 and can additionally or alternatively be used for other types of files, e.g., data files.

Table 1 shows an example of a portion of executable file 218. Table 1 shows an example of a conventional MICROSOFT WINDOWS Portable Executable (PE) file, but this example is not limiting. Executable file 218 can be, for example, an a.out, Common Object File Format (COFF), MZ (MS-DOS), NE (WINDOWS 3.1), PE, Mach-O, or Executable and Linkable Format (ELF) compiled object file (e.g., a standalone executable or a static or dynamic library), an ar static-library archive, a Java Archive (JAR), or a Dalvik Executable (DEX) archive.

TABLE 1

| Offset | Field |
| --- | --- |
| 0x00 | Pattern: 0x4D 0x5A |
| . . . | |
| 0x3C | Offset of PE header, referred to in this table as "OFS". |
| . . . | |
| OFS + 0x00 | Pattern: 0x50 0x45 |
| . . . | |
| OFS + 0x28 | Offset of entry point, in this table "ENTRY" |
| . . . | |
| ENTRY + 0x00 | The code to be executed after the executable file is loaded, typically library-provided startup code |
| . . . | |
| ENTRY + n | A jump from the startup code to the beginning of code specific to the particular executable file |
| . . . | |
| MAIN | The code specific to the particular executable file, e.g., compiled from the C main( ) function. |

In some examples, trial data stream 116 can include a predetermined number of bytes beginning at address ENTRY or at address MAIN in Table 1. In some examples, address ENTRY or address MAIN can be determined using a location chain, as discussed herein with reference to FIG. 5. In some examples, trial data stream 116 can include a predetermined number of bytes beginning at the beginning of a particular section of an executable file, e.g., a TEXT (code) or DATA segment. In some examples, trial data stream 116 can include a predetermined number of bytes beginning at a header with the trial data stream 116, e.g., an MP3 header or an ID3v2 or VORBIS comment block.

Computer-executable instructions or other data stored on CRM 214 can additionally or alternatively include at least one computational model (CM) 220, which can represent computational model 112, FIG. 1, or instructions of the operating system 216, a locating module 222, a representation module 224, a training module 226, an operation module 228, a communications module 230, and/or other modules, programs, and/or applications that are loadable and executable by processing unit(s) 210. Processing unit(s) 210 can be configured to execute modules of the plurality of modules. For example, the computer-executable instructions stored on the computer-readable media 214 can upon execution configure a computer such as a computing device 200 to perform operations described herein with reference to the modules of the plurality of modules. The modules stored in the computer-readable media 214 can include instructions that, when executed by the one or more processing units 210, cause the one or more processing units 210 to perform operations described below. For example, the computer-executable instructions stored on the computer-readable media 214 can upon execution configure a computer such as a computing device 102 and/or 104 to perform operations described herein with reference to the operating system 216 or the above-listed modules 222-230.

In some examples not shown, one or more of the processing unit(s) 210 in one of the computing device(s) 102 and/or 104 can be operably connected to computer-readable media 214 in a different one of the computing device(s) 102 and/or 104, e.g., via communications interface 232 (discussed below) and network 108. For example, program code to perform steps of flow diagrams herein, e.g., as described herein with reference to modules 222-230, can be downloaded from a server, e.g., computing device 102(1), to a client, e.g., computing device 104(K), e.g., via the network 108, and executed by one or more processing unit(s) 210 in computing device 104(K).

The computing device 200 can also include a communications interface 232, which can include a transceiver device such as a network interface controller (NIC) to send and receive communications over a network 108 (shown in phantom), e.g., as discussed above. As such, the computing device 200 can have network capabilities. Communications interface can include any number of network, bus, and/or memory interfaces, in any combination, whether packaged together and/or separately. In some examples, communications interface 232 can include a memory bus internal to a particular computing device 102 or 104, transmitting via communications interface 232 can include storing the transmitted data in memory 212 or computer-readable media 214, and receiving via communications interface 232 can include retrieving data from memory 212 or computer-readable media 214. In some examples, the communications interface 232 can include, but is not limited to, a transceiver for cellular (3G, 4G, and/or other), WI-FI, Ultra-wideband (UWB), BLUETOOTH, and/or satellite transmissions. The communications interface 232 can include a wired I/O interface, such as an Ethernet interface, a serial interface, a Universal Serial Bus (USB) interface, an INFINIBAND interface, and/or other wired interfaces. The communications interface 232 can additionally and/or alternatively include at least one user-interface device or user interface, at least one bus such as a memory bus and/or local bus, at least one memory interface, and/or at least one hardwired interface such as a 0-20 mA control line.

In some examples, the operating system 216 can include components that enable and/or direct the computing device 200 to receive data via various inputs (e.g., user controls such as input device 206, network and/or communications interfaces such as interface 232, devices implementing memory 212, and/or sensors), and process the data using the processing unit(s) 210 to generate output. The operating system 216 can further include one or more components that present the output (e.g., display an image on an electronic display 204, store data in memory 212, and/or transmit data to another computing device 102 or 104. The operating system 216 can enable a user (e.g., entity 110) to interact with the computing device 200 using a user interface 202. Additionally, the operating system 216 can include components that perform various functions generally associated with an operating system, e.g., storage management and internal-device management.

In some examples, the processing unit(s) 210 can access the module(s) on the computer-readable media 214 via a bus 234. I/O interface 208 and communications interface 232 can also communicate with processing unit(s) 210 via bus 234. Bus 234 can include, e.g., at least one of a system bus, a data bus, an address bus, a Peripheral Component Interconnect (PCI) Express (PCIe) bus, a PCI bus, a Mini-PCI bus, any variety of local, peripheral, and/or independent buses, and/or any combination thereof.

In various examples, the number of modules can vary higher and/or lower, and modules of various types can be used in various combinations. For example, functionality described associated with the illustrated modules can be combined to be performed by a fewer number of modules and/or APIs and/or can be split and performed by a larger number of modules and/or APIs. For example, the locating module 222 and the representation module 224 can be combined in a single module that performs at least some of the example functions described below of those modules. In some examples, computer-readable media 214 can include a subset of the above-described modules.

In the illustrated example, the locating module 222 determines an analysis region of the executable file 218. For example, the analysis region can extend from ENTRY to ENTRY+0x09, inclusive, in a PE such as that depicted in Table 1. Examples are discussed herein, e.g., with reference to at least FIG. 3, 5, 7, or 10.

In the illustrated example, the representation module 224 determines a model input, e.g., a data vector, based at least in part on the contents of the executable file 218 in the analysis region. For example, the representation module 224 can determine a 2560-bit long one-hot encoding of the 10-byte (80-bit) analysis region to serve as the model input. Examples are discussed herein, e.g., with reference to at least FIG. 3, 6, 7, 10, 11, or 13.

In the illustrated example, the training module 226 can determine the computational model 220, e.g., based at least in part on the model input. For example, the training module 226 can update parameters of an autoencoder based at least in part on the model input. Examples are discussed herein, e.g., with reference to at least FIG. 3, 6, or 9-13.

In the illustrated example, the operation module 228 can operate the computational model 220 based at least in part on the model input to provide a feature vector. The feature vector can be an example of a signature 118, FIG. 1. Examples are discussed herein, e.g., with reference to at least FIG. 3, 4, 7, 9, 11, or 13. In some examples, the operation module 228 can operate a second computational model (omitted for brevity) based at least in part on the feature vector to determine a classification 120, e.g., whether or not the executable file 218 is malware, or what type of malware the executable file 218 is. Operation module 228 can provide an output 236, e.g., a signature 118 or classification 120. Output 236 is shown as stored in computer-readable media 214. Output 236 can additionally or alternatively be stored in memory 212 or another processor-accessible storage device, e.g., a transmit buffer of communications interface 232.

In some examples, the operation module 228 can determine respective outputs 236 for multiple trial data streams 116. The operation module 228 can then locate data streams 116 similar to a given data stream 116 based at least in part on similarity of the outputs 236, e.g., based on Euclidean or another distance metric between the respective outputs 236 for multiple different data streams 116 (e.g., files).

In the illustrated example, the communications module 230 can transmit an indication of the output 236, e.g., via the communications interface 232. For example, the indication can be transmitted to a computing device 104. Examples are discussed herein, e.g., with reference to at least FIG. 3 or 8. In some examples, communications module 230 can additionally or alternatively receive the executable file 218 via the communications interface 232.

In some examples, the operation module 228, the communications module 230, or another module stored in computer-readable media 214 can be configured to receive inputs, e.g., via user-operable input device 206 or from a filesystem, transmit corresponding queries to a computing device 102, receive responses from computing device 102, and present the responses, e.g., via display 204. In some examples, determination and operation of computational models are carried out on computing device(s) 102. In some examples, determination and operation are carried out on a computing device 104. In some of these examples, any of the above-noted modules can be configured to receive inputs, determine and/or operate computational model(s) 112 using instructions of operation module 228 based at least in part on those inputs, e.g., to determine a model output. In some examples, computer-executable instructions on computer-readable media 214 can include, but are not limited to, instructions of a Web browser, smartphone app or desktop application, background service conducting or monitoring network communications, or instant-messaging client, or can include components of any of those configured to perform functions described herein. Such programs or components can invoke or include functions of any of the listed modules.

Illustrative Processes

Figure 3:
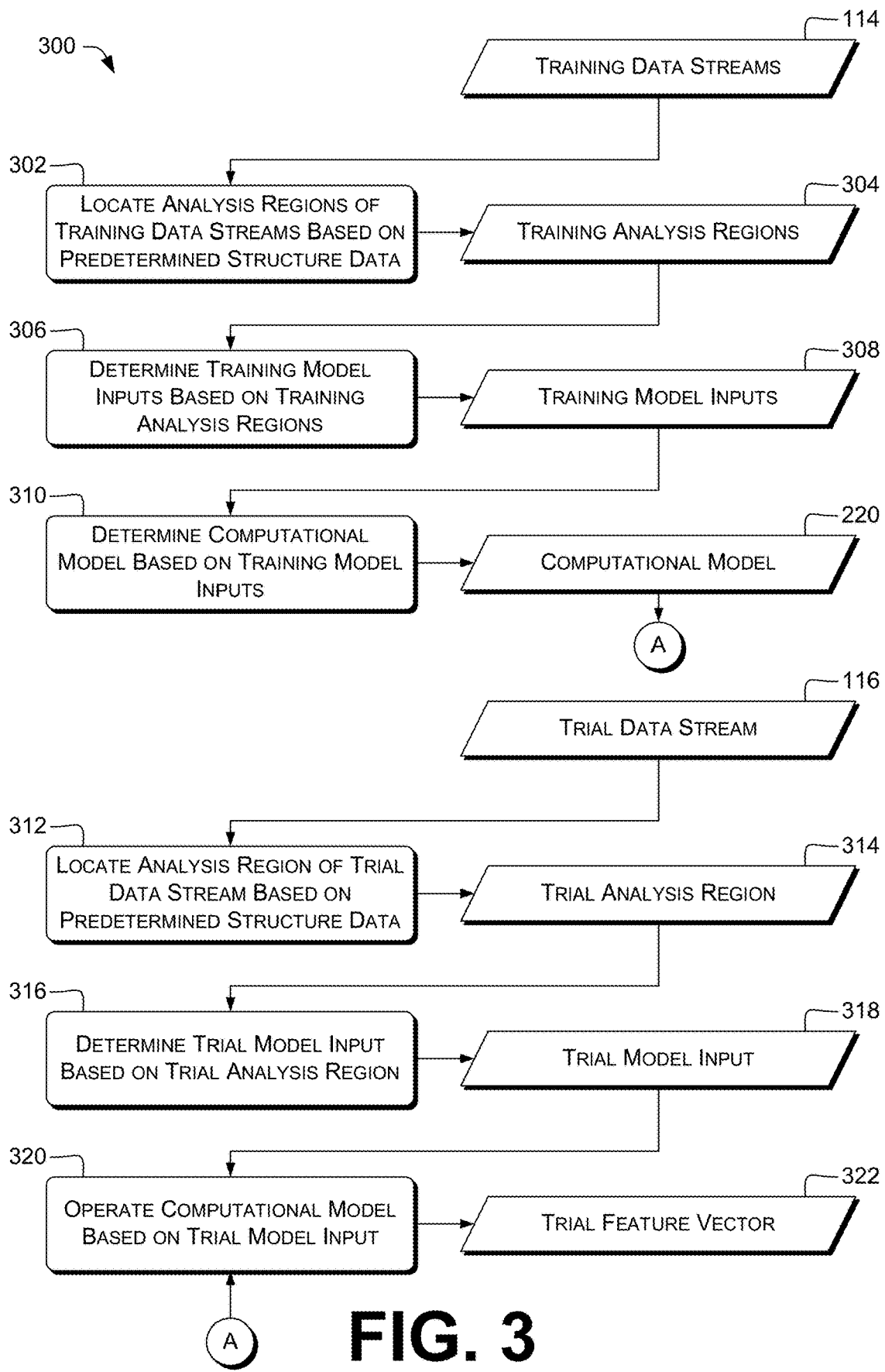
FIG. 3 is a dataflow diagram that illustrates example processes for determining and operating computational model(s) according to various examples described herein.

FIG. 3 is a dataflow diagram that illustrates an example process 300 for determining and operating computational model(s), and related dataflow. Example functions shown in FIG. 3 and other flow diagrams and example processes herein can be implemented on and/or otherwise embodied in one or more computing device(s) 102 and/or 104, e.g., a computing device 200, e.g., using software running on such device(s), e.g., software executed by processing unit(s) 210. For the sake of illustration, the example process 300 is described below with reference to processing unit 210 and other components shown in FIGS. 1 and 2 that can carry out and/or participate in the steps of the exemplary method. However, other processing unit(s) such as processing unit(s) 210 and/or other components of computing device(s) 102 and/or 104 can carry out step(s) of described example processes such as process 300. Similarly, exemplary method(s) shown in FIGS. 4-13 are also not limited to being carried out by any specifically-identified components.

The order in which the operations are described in each example flow diagram and/or process is not intended to be construed as a limitation, and any number of the described operations can be combined in any order and/or in parallel to implement each process. In each flow diagram, fewer than all of the depicted operations can be performed, except as expressly noted. Moreover, the operations in each of FIGS. 3-13 can be implemented in hardware, software, and/or a combination thereof. In the context of software, the operations represent computer-executable instructions that, when executed by one or more processors, cause the one or more processors to perform the recited operations. In the context of hardware, the operations represent logic functions implemented in circuitry, e.g., datapath-control and finite-state-machine sequencing functions. Therefore, descriptions of operations below also describe such software or hardware structures to carry out the described functions. Operations herein can be performed by modules described herein with reference to FIG. 2.

For clarity of explanation, the operations of FIG. 3 are described in terms of a batch process. However, this is not limiting, and the operations of FIG. 3 (or FIGS. 4-13) can be performed in a streamed or pipelined manner, or any combination of batch, stream, and pipelined processing.

In some examples, at operation 302, the locating module 222 locates respective training analysis regions 304 of individual training data streams of a plurality of training data streams 114 based at least in part on predetermined structure data. Each respective training analysis region 304 comprises or consists of a predetermined number of bits, e.g., a number of whole bytes (8-bit units) or other bit groupings. The predetermined number can be identified by data included in the predetermined structure data, hard-coded, or otherwise determined. For example, a training analysis region can comprise or consist of a span of 10 bytes, i.e., 80 bits. This is not limiting, and other sizes of training analysis region can additionally or alternatively be used, e.g., >100 bytes, >200 bytes, 512 bytes, one kilobyte, or larger buffers. In some examples, at least one individual training data stream 114, or each training data stream 114 (or trial data stream 116), comprises at least part of an executable file. For example, different data streams 114 or 116 can comprise respective, different regions of a particular executable file, e.g., one region starting at ENTRY and one starting at MAIN in the example given in Table 1. In some examples, at least one or each training data stream 114 or trial data stream 116 comprises or consists of part or all of a respective executable file.

In some examples, at operation 306, the representation module 224 determines respective training model inputs 308 based at least in part on the training analysis regions 304 (e.g., at least some of the training analysis regions 304, and likewise throughout this document). For example, the representation module 224 can determine the training model inputs 308 based at least in part on the contents, e.g., bit or byte values, of the respective training data streams 114 in the respective training analysis regions 304. In some examples, the representation module 224 can copy at least a portion of a training analysis region 304 to provide the training model input 308.

In some examples, the representation module 224 can encode at least some data of a training analysis region 304 into a one-hot encoding to provide the respective training model input 308. A one-hot encoding can include a single value, e.g., a single bit, for each possible value of each byte. For example, a one-byte training analysis region 304 consisting of a single byte with value b, $b \in [0,255]$, can be represented by a 256-bit one-hot encoding. The encoding, expressed as a vector $v_i$, $i \in [0,255]$, is defined as $v_i = \delta_{ib}$ (Kronecker delta). Therefore, for any value of b, the corresponding vector $v_i(b)$ will have exactly one value of 1 and exactly 255 values of 0.

In some examples, the representation module 224 can determine at least one of the training model inputs 308 as a bag-of-values representation of the respective training analysis region 304. For example, an n-element training analysis region 304, denoted r, can be represented as a vector v of pairs, the vector having at most n elements. Each element of v is a pair of (value, # of occurrences). The number of elements in v is the number of distinct values in r. For example, the training analysis region 304 r=[42, 42, 31, 41, 42, 59] can be represented by the bag-of-values representation v=[(42,3), (31,1), (41,1), (59,1)]. A bag-of-values representation can be sorted by element value or occurrence count, or can be left unsorted.

In some examples, the representation module 224 can determine at least one of the training model inputs 308 using other representations or processing of the respective training analysis region 304. For example, the representation module 224 can compress (e.g., Huffman, zip, gzip, bzip2, or 7-ZIP), encode (e.g., entropy coding), filter, subsample, or otherwise process the training model input 308 to provide the respective training analysis region 304.

Each respective training model input 308 comprises or consists of a first number of values. For example, the training model input 308 can comprise or consist of 2560 binary values, expressing the contents of the 10-byte span in a one-hot encoding. In this and other examples, the training model input 308 can comprise or consist of a number of bits equal to the number of possible values of the training analysis regions 304.

In some examples, the training module input 308 can comprise or consist of a number of bits equal to the number of bits of the training analysis regions 304. For example, a single octet of a training analysis region 304 can be converted to eight binary values of the training model input 308, one binary value for each bit of that octet. In some examples, the training model input 308 can comprise or consist of a number of bits equal to the number of possible values of at least a portion of a training analysis region 304. For example, a two-byte segment of the training analysis region 304 can have 65,536 possible values, and a corresponding training model input 308 can include 65,536 binary values of a one-hot encoding. The at least a portion of the training analysis region 304 can include any number of bits, octets, or other groupings. The at least a portion of the training analysis region 304 can include or consist of the entirety of the training analysis region 304. The examples herein are given in binary for clarity of explanation, but this is not limiting. For example, other bases such as ternary can be used. Additionally or alternatively, a single value of the training module input 308 can represent more than one bit (or trit or other indivisible value in a particular base) of the training analysis region 304. For example, a single value of the training module input 308 can represent three, four, or a different number of bits of the training analysis region 304.

In some examples, at operation 310, the training module 226 determines a computational model 220 based at least in part on the training model inputs 308. For example, the training module 226 can train CM 220 using backpropagation in a gradient-descent framework or can conduct independent-components analysis, least-squares or other regression analyses, or other training techniques or algorithms described herein. In some examples, the training module 226 can perform stochastic gradient descent. In some examples, the training module 226 can train the computational model 220 in a supervised or unsupervised manner. Examples of unsupervised learning include stochastic gradient descent learning of a denoising autoencoder, as discussed herein with reference to FIG. 6, e.g., operation 610. In some examples, the training module 226 can perform training per batch or minibatch. In some examples, the computational model 220 is configured to receive as input an input vector comprising the first number of values (e.g., 2560). For example, the training module 226 can provide the training model inputs 308 as respective input vectors to the CM 220.

In some examples, e.g., of autoencoders, the CM 220 is configured to provide as output an output vector approximating the input vector. In some examples, the CM 220 is additionally or alternatively configured to provide as output a feature vector. The feature vector can include or consist of a second number of values that is less than the first number of values, in some examples. For example, the CM 220 can provide a signature 118 comprising or consisting of 20 (or another number of) integer or float values. In some examples, the feature vector occupies fewer bits than the input vector. For example, a vector of 20 IEEE-754 single-precision floating-point values occupies 640 bits, and a vector of 20 IEEE-754 double-precision floating-point values occupies 1280 bits. Both of those are less than the 2560 bits of a one-hot encoding of 10 bytes of input, as discussed above. In some examples, the CM 220 can output any number of values, e.g., more values than the first number of values, and the feature vector can include fewer than all of the values output by the CM 220.

In some examples, the computational model 220 comprises a neural network (NN). The NN comprises at least one hidden layer and, in some examples, the feature vector comprises at least one output of the at least one hidden layer. For example, an autoencoder computational model 220 can be implemented using a neural network having at least one hidden layer that has fewer neurons than the input layer and the output layer. The feature vector can include values output by that hidden layer. In some examples, the computational model 220 comprises a gradient-boosted NN.

In some examples, e.g., using bag-of-bytes encoding, at operation 310, the training module 226 can partition the set of training model inputs 308 into an initial set and a (possibly larger) subsequent set. The training module 226 can train an initial computational model, e.g., an SVM, in a supervised manner based on the initial set. In other examples, the training module 226 can train an initial computational model in an unsupervised manner. The training module 226 can then determine the computational model 220 in a supervised manner, using the outputs from the initial computational model as reference data and the subsequent set as training samples. This can permit determining the computational model 220 so that it can extract differences in the distributions of byte patterns between the outputs of different generators.

In some examples, at operation 312, locating module 222 locates a trial analysis region 314 of a trial data stream 116 based at least in part on the predetermined structure data. The trial analysis region 314 can comprise or consist of the predetermined number of bits. Examples are discussed herein, e.g., with reference to operation 302.

In some examples, at operation 316, the representation module 224 determines a trial model input 318 based at least in part on the trial analysis region 314. The trial model input 314 can comprise or consist of the first number of values. Examples are discussed herein, e.g., with reference to operation 306.

Figure 9:
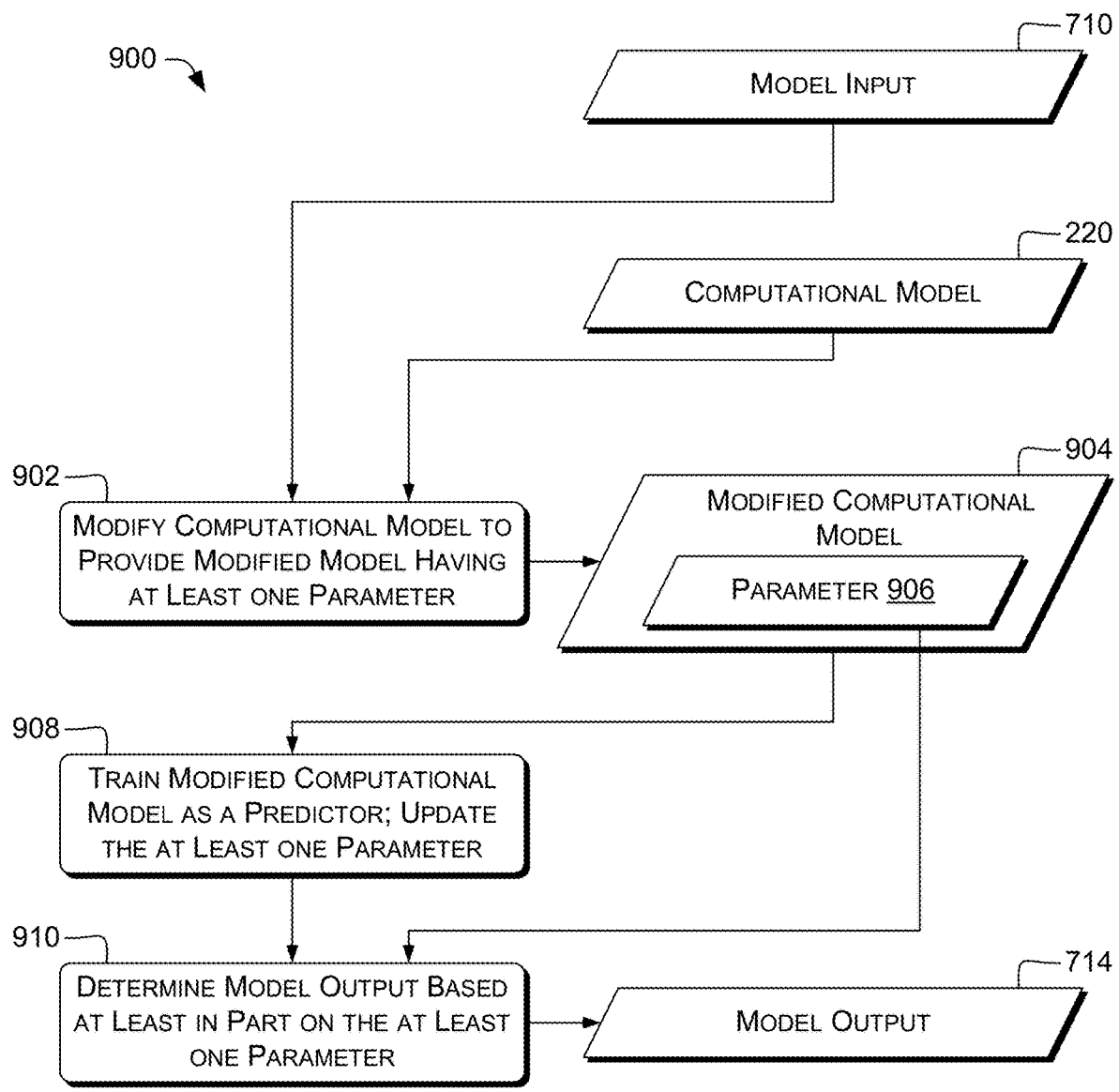
FIG. 9 is a dataflow diagram that illustrates example processes for operating computational model(s), including training operations, according to various examples described herein.

In some examples, at operation 320, the operation module 228 operates the computational model 220 based at least in part on the trial model input 314 to provide a trial feature vector 322 comprising the second number of values. Examples are discussed below and elsewhere herein, e.g., with reference to operations 402, 616, 712, or 806; FIG. 9; or operations 1118 or 1318.

In some examples using a neural network computational model 220, the operation module 228 provides the trial model input 318 as input to the neural network, which includes a hidden layer. The operation module 228 propagates values through the NN to the hidden layer and determines the trial feature vector (or other model output of the computational model 220) based at least in part on output(s) of the hidden layer. For example, outputs of the hidden layer can represent internal encodings of the model inputs, e.g., in an autoencoder implemented using a neural network. In some examples, e.g., using bag-of-values (e.g., bag-of-bytes) encodings, the computational model 220 can be configured to provide the trial feature vector 322 and also a confidence value indicating how accurate the computational model 220 considers the trial feature vector 322 to be.

Figure 4:
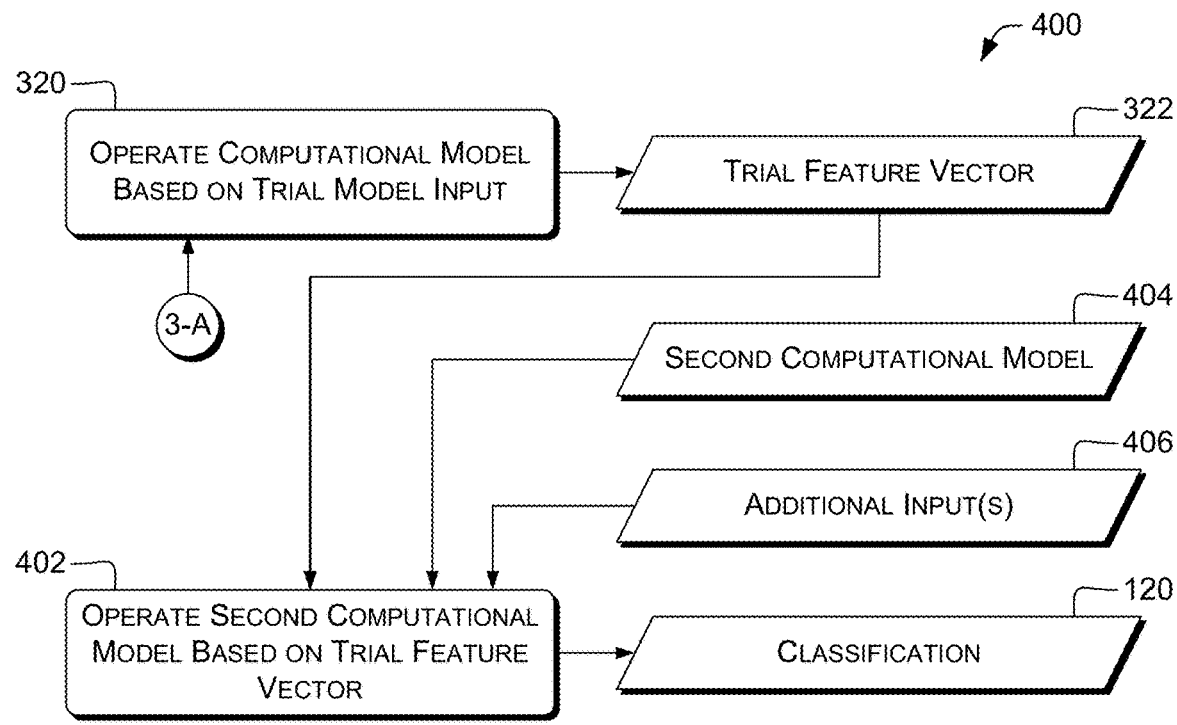
FIG. 4 is a dataflow diagram that illustrates example processes for operating computational model(s) to determine a classification according to various examples described herein.

FIG. 4 is a flow diagram that illustrates an example process 400 for operating computational model(s). Operation 320 can be followed by operation 402.

In some examples, at operation 402, the operation module 228 operates a second computational model 404 based at least in part on the trial feature vector 322 to determine whether the trial data stream 116 is associated with malware. For example, the second computational model 404 can operate on the trial feature vector 322 to provide a classification 120 indicating whether trial data stream 116 is associated with malware, or is associated with a specific type of malware. In some examples, the second computational model 404 can be or include a neural network, a tree-based model, a support vector machine, or other type of computational model described above, trained for classification (binary or multi-class). Operation 402 can include providing the trial feature vector 322 as input to the second computational model 404 and performing computations indicated by second computational model 404 and its parameters to determine classification 120 as a model output of the second computational model 404. In some examples, the second computational model 404 can be trained, using a supervised learning process, on samples of known malware and of known-benign files.

The second computational model 404 can take as input the entirety of the trial feature vector 322, or only a portion thereof. In some examples, the trial feature vector 322 can be provided to the second computational model 404 as a single, composite model input; in some examples, individual components of the trial feature vector 322 (e.g., individual numeric values) can be provided to the second computational model 404 as respective model inputs. In some examples, the second computational model 404 may give respective, different weights to at least two components of the trial feature vector 322. In some examples, the second computational model 404 can take as input at least one additional input 406. Additional input 406 can include, e.g., additional feature(s) determined based at least in part on the trial model input 318.

Figure 5:
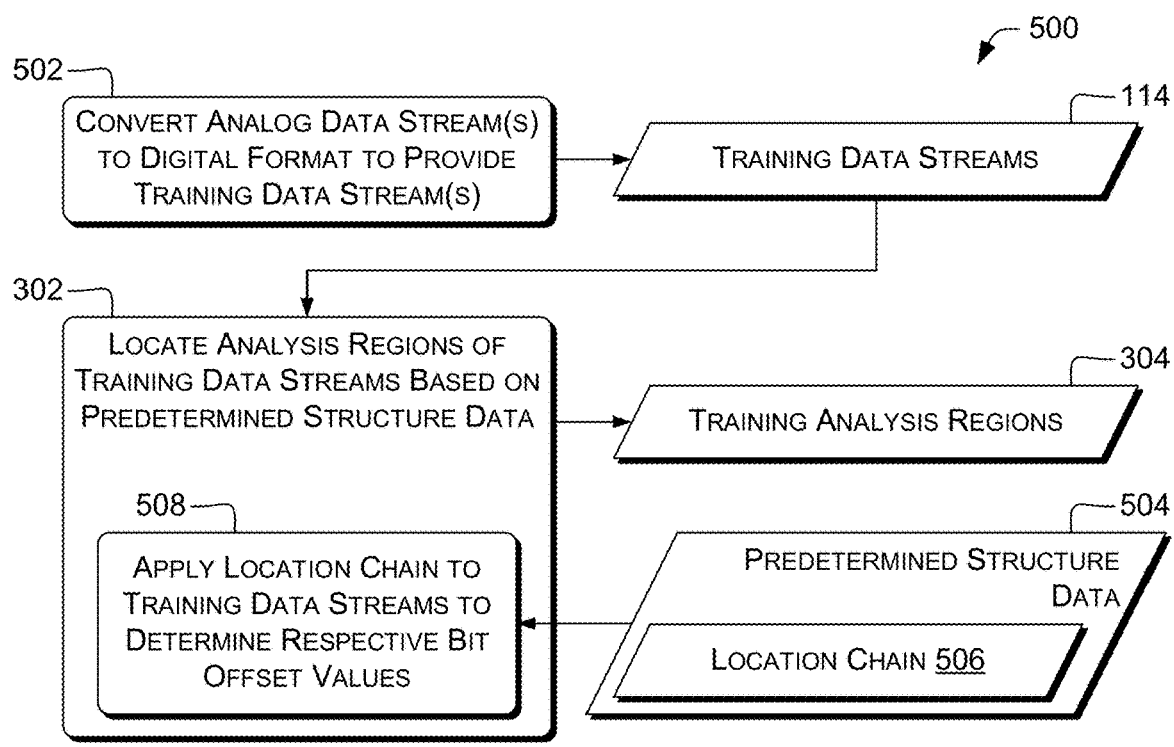
FIG. 5 is a dataflow diagram that illustrates example processes for determining computational model(s) according to various examples described herein.

FIG. 5 is a flow diagram that illustrates an example process 500 for training computational model(s). Operation 502 can provide the training data streams 114. Operation 302 can be followed by or include operation 508.

In some examples, at operation 502, the communications module 230 can convert analog data stream(s) to a digital format to provide respective one(s) of the training data stream(s) 114. For example, the communications module 230 can perform analog-to-digital (A/D) conversion, or operate a hardware analog-to-digital converter (ADC) and collect the digital data from the ADC. Similarly, throughout this document, training data stream(s) 114 or trial data stream(s) 116 can be provided via analog-to-digital conversion using these or other A/D techniques.

In some examples, the predetermined structure data 504 comprises data of a location chain 506. The location chain 506 can include at least one of: an initial offset; a pointer location; or an instruction to access an offset located at a current offset in the data stream. For example, the location chain 506 can be or include a program in a general-purpose programming language (interpreted or compiled) or a domain-specific language (DSL), or a finite state machine or other automaton, configured to jump and index through a training data stream 114 to find, e.g., an entry point address such as ENTRY in Table 1. For example, the location chain can be implemented as a small bytecode interpreter or a hardcoded routine.

In some examples, at operation 508, the training module 226 applies the location chain 506 to the individual training data streams 114 to determine respective bit offset values, e.g., of entry points of executable files. Accordingly, in some examples, operation 302 includes determining the respective training analysis regions 304 comprising respective portions, commencing at the respective bit offset values and extending for the first bit length, of the respective training data streams 114.

In some examples, the predetermined structure data 504 comprises the location chain 506 that associates an executable file 218 with an entry point. In the example of Table 1, the entry point is address "ENTRY". The respective training analysis region 304 of at least one individual training data stream 114 commences at the entry point. Continuing the example of Table 1, the location chain 506 can include operations indicated in pseudocode form in Table 2. In the nonlimiting example in Table 2, a current pointer P is initialized to point to the beginning of the input data stream 114. Offsets from P are denoted "P[n]." P is a byte pointer; "P32(P)" is P, but pointing to a 32-bit value. The operation "die" terminates execution of the location chain 506 with an indication that the bit offset value could not be determined. The operation "=" tests equality, ":=" assigns, and "x↑" dereferences pointer x; other operations are as in C.

TABLE 2

| Value of P | Pseudocode of location chain | Notes |
|---|---|---|
| 0x00 | (P[0]=0x4D && P[1]=0x5A) or die P := 0x3C | Test for pattern 0x4D 0x5A ("MZ") |
| 0x3C | P := P32(P)↑ | Now P holds OFS, the offset of the PE header. |
| OFS | (P[0]=0x50 && P[1]=0x45) or die P += 0x28 | Test for pattern 0x50 0x45 ("PE") |
| OFS + 0x28 | P := P32(P)↑ | Now P holds ENTRY, the offset of the entry point |
| ENTRY | return P*8 | P is the byte offset for the start of the training analysis region 304 |

In some examples, the predetermined structure data 504 comprises computer-executable instructions that, when executed by at processing unit(s) 210, operate on at least one of the individual training data streams 114 to determine the respective training analysis region(s) 304. For example, the predetermined structure data 504 can include a script, an analysis program such as PEDUMP or objdump, or another program that performs processing to determine the training analysis region 304 of a training data stream 114.

In some examples, the predetermined structure data 504 comprises a bit offset (e.g., a byte offset) and at least one training analysis region 304 includes a portion, commencing at the bit offset and extending for the predetermined number of bits, of the respective training data stream 114. For example, the bit offset can be a bit offset within a file or a header of a file, e.g., an executable or other file. In some examples, the predetermined structure data 504 can include data of an offset (e.g., a bit or byte offset) of the analysis region within the data stream.

Figure 6:
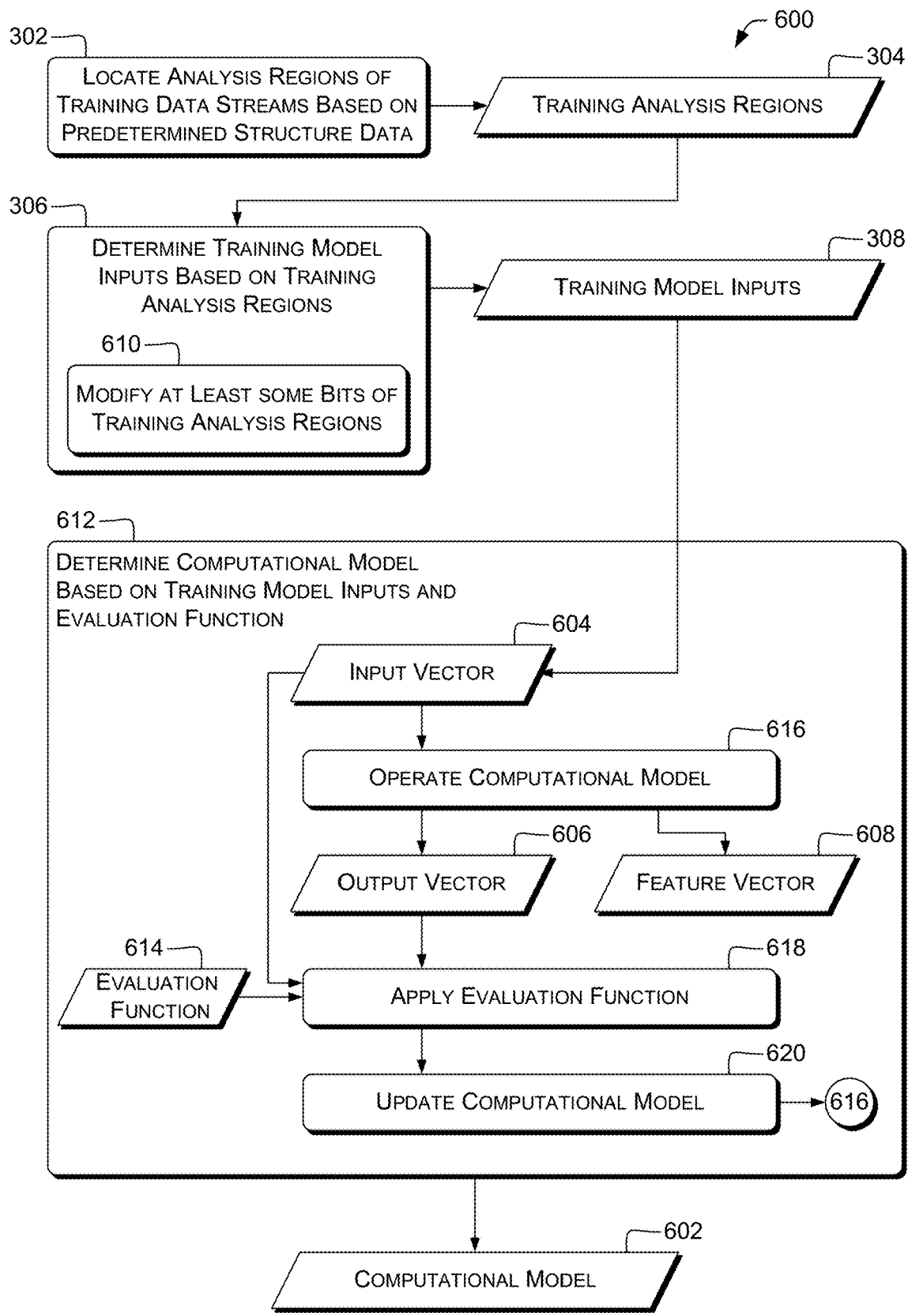
FIG. 6 is a dataflow diagram that illustrates example processes for determining computational model(s), e.g., denoising models, using location chains according to various examples described herein.

FIG. 6 is a flow diagram that illustrates an example process 600 for training computational model(s). In the illustrated examples, computational model 602, which can represent computational model 220, comprises an autoencoder, e.g., a denoising autoencoder. Computational model 602 receives as input an input vector 604 and provides as output an output vector 606 approximating the input vector 604 and a feature vector 608, as described above. Feature vector 608 can represent trial feature vector 322, FIG. 3. Operation 306 can include operation 610. Operation 612 can represent or be included in operation 310. In some examples, only one of operations 610 and 612 is used; in some examples, both operations 610 and 612 are used.

In some examples, the computational model 602 can include a first layer array configured to produce the feature vector 608 based at least in part on the input vector 604. The first layer array can include at least one layer of artificial neurons. Unless otherwise specified, any "array" herein can include one or more elements. For example, the feature vector 608 can be an output of a hidden layer that is the last (or only) layer in the first layer array. The computational model 602 can additionally or alternatively include a second layer array configured to produce the output vector 606 (or other model output) based at least in part on the feature vector 608. For example, the output vector 606 can be an output of the last (or only) layer in the second layer array. In some examples in which the feature vector 608 comprises or consists of fewer values than the output vector 606, the computational model 602 can be trained as an autoencoder that provides a lower-dimensional representation of the input vector 604.

In some examples, at operation 610, the training module 226 modifies at least some bits of at least some of the training analysis regions 304 to provide the respective training model inputs 308. For example, the training module 226 can provide the training model inputs 308 as corrupted copies of the respective training analysis regions 304. In some examples, the training module 226 forces one or more bits of the training model inputs 308 to values of 0 or 1, e.g., randomly (or pseudorandomly, and likewise throughout this document). In some examples, the training module 226 selects training model inputs 308 to corrupt randomly based on a predetermined probability of input corruption, and modifies each individual bit of a selected training model input 308 with a predetermined probability of bit modification. In some examples, the training module 226 can modify bit(s) of training analysis region(s) 304 by adding Gaussian or other noise to one or more bits; or by flipping, setting, or clearing randomly-selected bits.

In some examples, at operation 612, the training module 226 determines parameter values of the computational model 602 based at least in part on an evaluation function 614. The evaluation function 614 can penalize differences between the output vectors 606 and the respective training model inputs 308, e.g., the respective input vectors 604. Operation 612 can include operations 616, 618, or 620. Operation 612 can be repeated for each of a plurality of training model inputs 308 or batches or minibatches thereof. In some examples in which the gradient of the evaluation function 614 can be computed without operating the computational model, operation 612 can include operation 620.

In some examples, implementing operation 610 causes the autoencoder training process of operation 612 to train the computational model 602 as a denoising autoencoder capable of tolerating variations in the specific byte or bit values that are input. For example, the trained computational model 602 can capture regularities or patterns in the training model inputs 308 and express those regularities in the lower-dimensional space of feature vector 608. This can improve the robustness of the determination of signatures 118 or classifications 120 in the face of variations, e.g., due to malware authors writing new generators.

In some examples, at operation 616, the training module 226 operates the computational model 602 based at least in part on an input vector 604, e.g., a training model input 308. The computational model 602 may not yet be fully trained, i.e., may not have final parameter values. However, the computational model 602 can still be operated to produce results, namely output vector 606 and feature vector 608. For example, the input vector 604 can include or consist of a training example or a minibatch of training examples.

In some examples, at operation 618, the training module 226 operates the evaluation function 614 to compare the input vector 604 with the output vector 606. For example, the training module 226 can compute an absolute, percentage, root-mean-square (RMS), or other difference, cross-entropy loss, or other statistical measure of the similarity or difference between the input vector 604 and the output vector 606. The evaluation function 614 can, in various examples, provide higher values for higher similarity (e.g., a score function) or for lower similarity (e.g., a loss function such as cross-entropy loss).

In some examples, at operation 620, the training module 226 updates the computational model 602 based at least in part on the results of the evaluation function 614. For example, operation 620 can include performing a gradient-descent, Newton's method, or hill-climbing operation to adjust the parameters of computational model 602 so that computational model 602 will likely produce output vectors 606 more closely approximating the respective input vectors 604. In some examples, operation 620 can be followed by operation 616. This can permit carrying out mathematical optimization processes to determine computational model 602. Other examples of evaluation and updating can additionally or alternatively be used, e.g., as discussed herein with reference to FIGS. 11 and 13.

Various examples using operation 612 can provide a trained autoencoder computational model 602 that can represent an input vector 604 using a feature vector 608 having fewer values than the input vector 604 has. This reduction in feature count can reduce the dimensionality of inputs of downstream models such as second computational model 404, FIG. 4. This can, in turn, reduce the time required to train second computational model 404, or can reduce the memory, CPU, or network usage of a training process of second computational model 404. Some examples can permit improving the accuracy of second computational model 404 by reducing the risk of overfitting in the training of second computational model 404.

Some examples provide feature vectors 608 that express characteristics of respective data streams using less data than would be required for a one-hot or other encoding of an analysis region ("raw features"). This can reduce the amount of context required to be learned by downstream models. Consequently, downstream models (in some examples) can have reduced complexity, size, or execution time compared to models based on raw features. Some examples can provide features in feature vector 608 that are more useful in training downstream models, e.g., as measured by the accuracy or precision of the downstream models in classifying data streams, than are input vectors 604 used directly, or other raw features.

Figure 7:
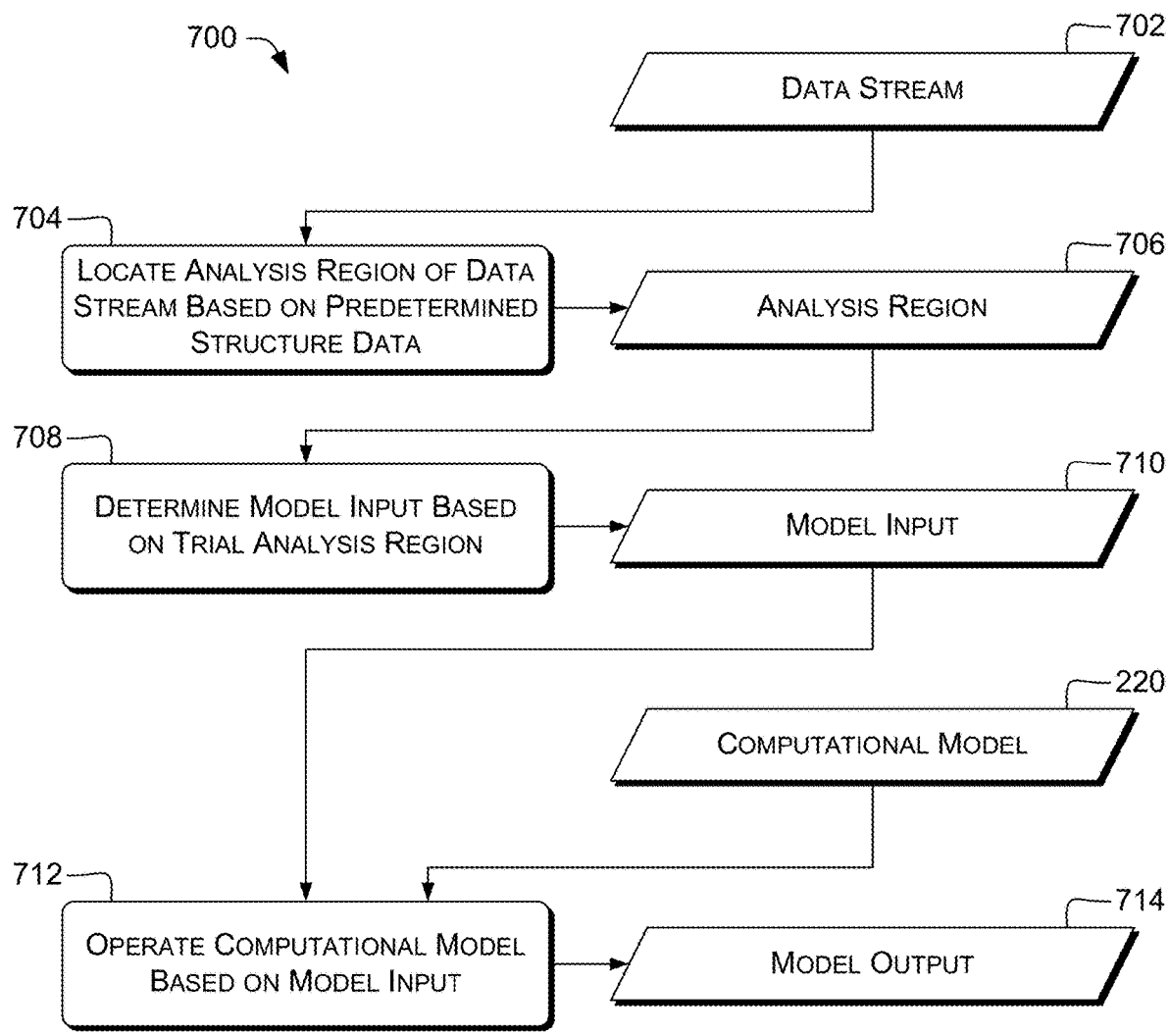
FIG. 7 is a dataflow diagram that illustrates example processes for operating computational model(s) according to various examples described herein.

FIG. 7 is a dataflow diagram that illustrates an example process 700 for operating computational model(s), and example data items. Process 700, as other processes herein, can be carried out by processing unit(s) 210 configured to execute instructions stored on a computer-readable medium 214. Process 700 can operate on a data stream 702, which can represent training data stream 114 or trial data stream 116. For example, the data stream 702 can include at least part of (e.g., part or all of) an executable file 218, FIG. 2.

In some examples, at operation 704, the locating module 222 locates an analysis region 706 of the data stream 702 based at least in part on predetermined structure data 504. The analysis region 706 comprises a predetermined number of bits. Examples are discussed herein, e.g., with reference to operation 312. For example, the analysis region 706 can include at least some computer-executable instructions of the executable file 218.

In some examples, e.g., as discussed herein with reference to FIG. 5, the predetermined structure data 504 comprises data of a location chain 506. In some of these examples, at operation 704, the locating module 222 can apply the location chain 506 to the data stream 702 to determine a result bit offset. The locating module 222 can then locate the analysis region 706 beginning at the result bit offset in the data stream. Examples are discussed herein, e.g., with reference to operation 508.

In some examples, at operation 708, the representation module 224 determines a model input 710 based at least in part on the analysis region 706. Examples are discussed herein, e.g., with reference to operation 316. For example, the representation module 224 can copy, or determine a one-hot encoding of, part or all of the analysis region 706.

In some examples, at operation 712, the operation module 228 operates computational model 220 using the model input 710 to provide a model output 714 associated with the data stream 702. Examples are discussed herein, e.g., with reference to operation 320. The model output 714 can comprise or consist of fewer values than does the model input 710.

In some examples, the operation module 228 can repeat locating operation 704, determining operation 708, and model-operating operation 712 with respect to a second trial data stream 116 to determine a second model output associated with the second trial data stream 116. Operation module 228 can then determine a similarity value between the model output 714 and the second model output, e.g., a Euclidean, earth-mover's, or other distance metric between the model output 714 and the second model output. This can permit locating files that are similar, even without explicit knowledge of the specific types of particular files or the generators used in preparing particular files.

Figure 8:
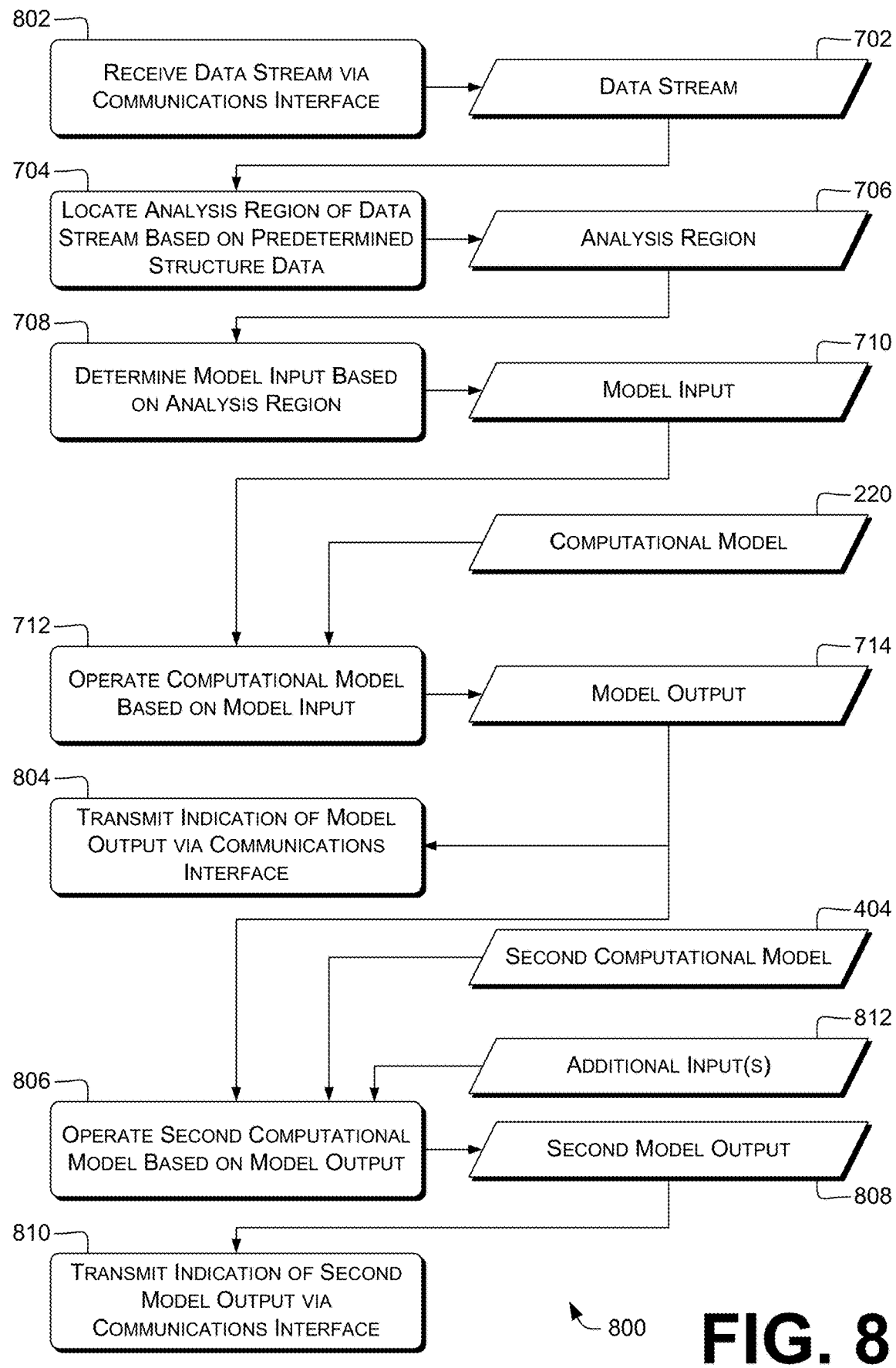
FIG. 8 is a dataflow diagram that illustrates example processes for operating computational model(s), e.g., in a service offered via communications interface(s), according to various examples described herein.

FIG. 8 is a flow diagram that illustrates an example process 800 for operating computational model(s). Operation 704 can be preceded by operation 802. Operation 712 can be followed by operation 804 or operation 806. In some examples, process 800 is carried out by computing device(s) incorporating or operably connected with a communications interface 232. Some examples include at least one of the following sets of operations: operation 802; operation 804; operations 802 and 804; operation 806; operations 806 and 810; either operation 802 or operation 804, plus operations 806 and 810; or all of operations 802, 804, 806, and 810.

In some examples, at operation 802, the communications module 230 receives the data stream via the communications interface 232. For example, the data stream can include, but is not limited to, code, audio, text, or other file contents. For example, the communications module 230 can receive at least some of the data stream in the form of a HTTP request transmitted via a Transmission Control Protocol (TCP) connection. In some examples omitted for brevity, the data stream can be retrieved from computer-readable media 214 instead of or in addition to being received via communications interface 232. In some examples, the data stream can be associated with a user, e.g., entity 110. For example, an HTTP request conveying the data stream, e.g., in a body of the request, can include a URL parameter, HTTP cookie, or other identifying information associated with the user.

In some examples, at operation 804, the communications module 230 transmits an indication of the model output via the communications interface 232. Examples are discussed herein, e.g., with reference to FIGS. 1 and 2. For example, the communications module 230 can transmit data of or indicating a signature 118 or classification 120 in an HTTP response header or body, or other response to a request or unprompted transmission. In some examples, the communications module 230 can transmit a filename, hash, or other indication of the data stream accompanying or associated with the data stream. This can permit, e.g., exchanging classifications between databases or between a user's computer and a cloud service.

In some examples, at operation 806, the operation module 228 operates a second computational model 404 based at least in part on the model output 714 to provide a second model output 808 indicating whether the data stream 702 is associated with malware. Examples are discussed herein, e.g., with reference to operation 402. Operation 806 can include operating the second computational model further based at least in part on additional inputs 812. Additional inputs 812 can include, e.g., additional features determined based at least in part on data stream 702.

In some examples, at operation 810, the communications module 230 transmits an indication of the second model output via the communications interface 232.

FIG. 9 is a flow diagram that illustrates an example process 900 for operating computational model(s). In some examples, the operation module 228 can determine the model output based at least in part on parameters of the computational model 220 instead of or in addition to values produced by the computational model 220. In some examples, operation 712, FIG. 7, can include operations 902, 908, and 910.

In some examples, at operation 902, the operation module 228 modifies the computational model 220 based at least in part on the model input 710 to provide a modified computational model 904 having at least one parameter 906. For example, the parameter 906 can be what will be, after training, the model output 714. In some examples, operation 902 includes initializing the representation of the model input 710 for a new training run. The modified computational model 904 can include at least some parameter(s) copied or derived from the computational model 220, e.g., parameters relating to the encodings of individual model inputs (e.g., one-hot vectors). The parameter 906 can be a parameter relating to the context provided by a sequence or grouping of inputs, e.g., in model input 710.

In some examples, at operation 908, the operation module 228 (or the training module 226) can train the modified computational model 904 as a predictor. Operation 908 can include updating the at least one parameter. For example, the modified computational model 904 can be trained using a plurality of training samples drawn from the model input 710. The modified computational model 904 can be trained, e.g., as an autoencoder; as a sequence predictor as discussed herein with reference to FIG. 11, or using CBOW or Skip-Gram training, as discussed herein with reference to FIG. 13. The training can include iteratively updating the parameter 906 using a mathematical optimization technique such as stochastic gradient descent with backpropagation or other training algorithms or techniques described herein. In some examples, only the at least one parameter 906 is updated during training; in other examples, the at least one parameter 906 and at least one other parameter are updated during training. Other training operations described in this document can additionally or alternatively use techniques described in this paragraph.

In some examples, at operation 910, the operation module 228 can determine the model output 714 based at least in part on the at least one parameter 906. For example, the operation module 228 can determine the model output 714 equaling or containing value(s) of the at least one parameter 906, or hashes or other compressed or encoded versions thereof. Since parameter 906 has been modified during training to cause the computational model 904 to, e.g., effectively predict portions of the model input 710 based at least in part on other portions of the model input 710, the parameter 906 includes encoded information about the model input 710. Accordingly, the parameter 906 can be a signature 118 of the model input 710.

Figure 10:
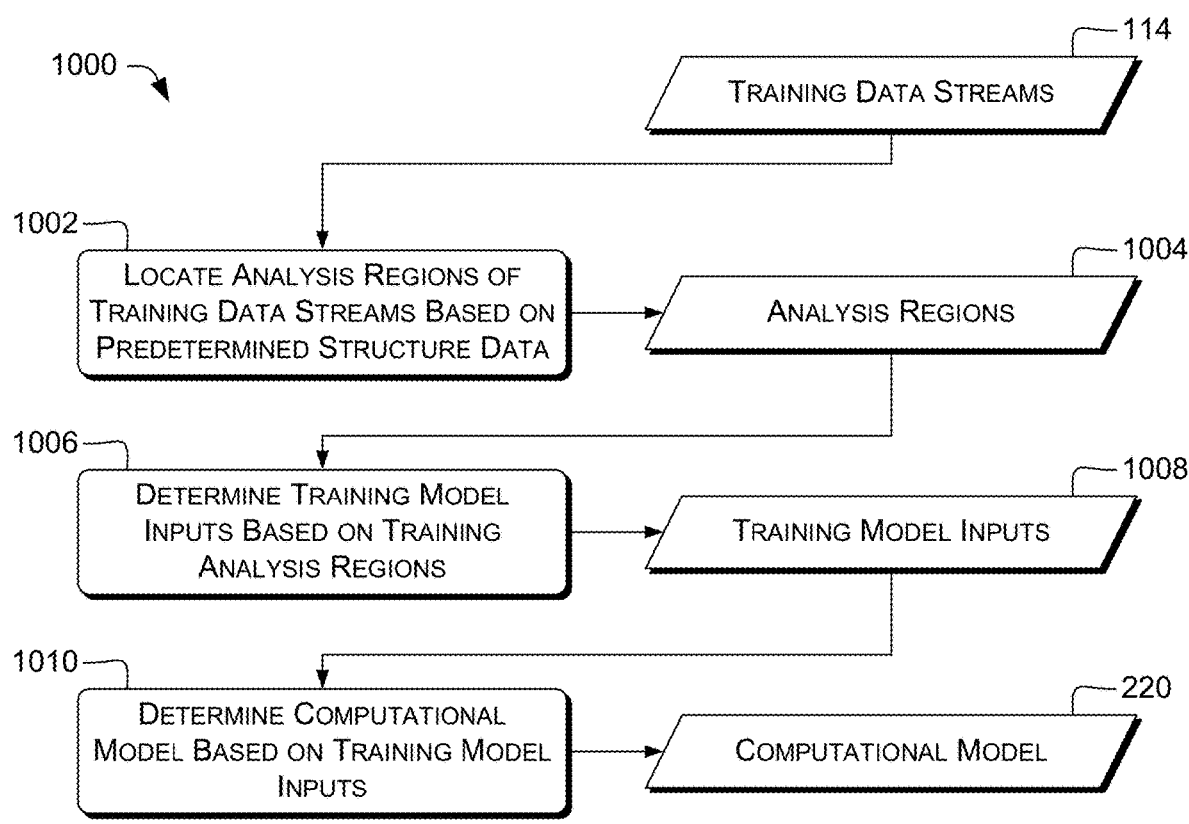
FIG. 10 is a dataflow diagram that illustrates example processes for determining computational model(s) according to various examples described herein.

FIG. 10 is a dataflow diagram that illustrates an example process 1000 for training computational model(s), and example data items. Process 1000 can be carried out, e.g., by at least one processing unit 210. Process 1000 can take as input at least one training data stream 114.

In some examples, at operation 1002, the locating module 222 locates respective analysis regions 1004 of individual training data streams 114 of a plurality of training data streams 114 based at least in part on predetermined structure data. Examples are discussed herein, e.g., with reference to operation 302. Examples of predetermined structure data are discussed herein, e.g., with reference to FIG. 5, e.g., operation 508.

In some examples, at operation 1006, the representation module 224 can determine respective training model inputs 1008, which can represent training model inputs 308, based at least in part on the respective analysis regions 1004. Each respective training model input 1008 can include or consist of a first number of values. Examples are discussed herein, e.g., with reference to operation 306. In some examples, the representation module 224 can determine at least one of the training model inputs 1008 as a one-hot representation of the respective analysis region 1004. In some examples, at operation 1006, the representation module 224 can determine at least one of the training model inputs 1008 as a bag-of-values representation of the respective analysis region 1004. Examples of one-hot, bag-of-values, and other representations are discussed herein, e.g., with reference to operation 306 and training model inputs 308.

In some examples, at operation 1010, the training module 226 can determine a computational model 220 based at least in part on the training model inputs 1008. Examples are discussed herein, e.g., with reference to operation 310. In some examples, the computational model 220 is configured to receive as input a model input comprising the first number of values and to provide as output a feature vector comprising a second number of values. The second number of values can be, e.g., greater than, less than, or equal to the first number of values. The model input can be provided, e.g., as a vector presented as a whole to the computational model 220; as values presented one at a time to the computational model 220, or any combination of joint and separate values. In some examples, 2560 one-hot binary values are provided to the model and 20 float values are output by the model. In some examples, ten bytes are provided to the model, e.g., all at once or in a sequence of values, and 20 float values are output by the model.

In some examples, the computational model is further configured to provide as output a model output comprising the first number of values, e.g., bits or float values. At operation 1010, in some examples, the training module 226 can train the computational model 220 as an autoencoder, e.g., a denoising autoencoder, based at least in part on an evaluation function that penalizes differences between the training input and the model output. Examples are discussed herein, e.g., with reference to operation 310 or FIG. 6. For example, the computational model 220 can be trained as an autoencoder that maps one-hot encodings of portions of data streams to themselves, through a hidden layer that produces a relatively small number of float values or other numerical values.

Figure 11:
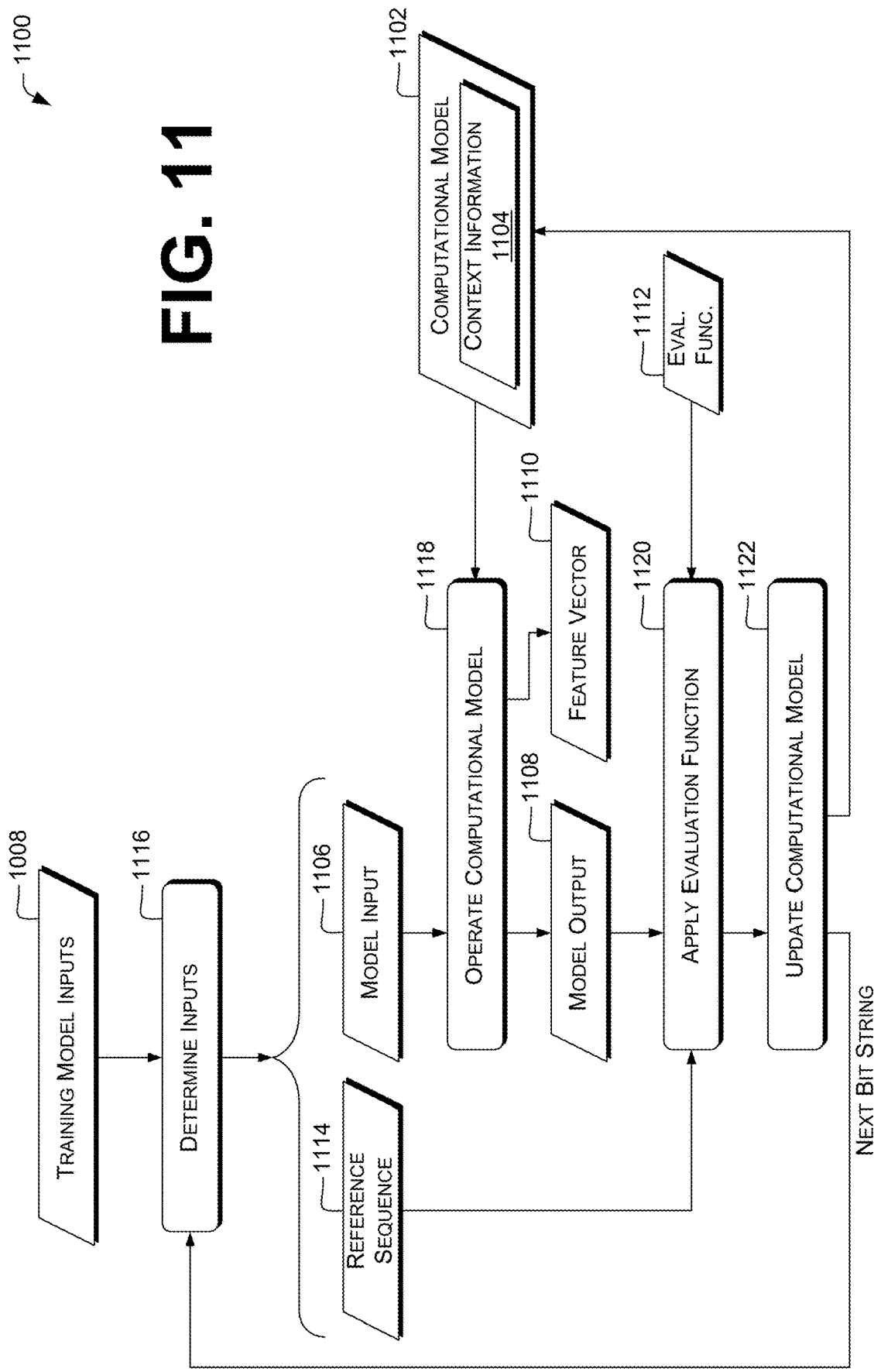
FIG. 11 is a dataflow diagram that illustrates example processes for determining computational model(s) that maintain context information according to various examples described herein.

FIG. 11 is a flow diagram that illustrates an example process 1100 for training computational models, shown as computational model 1102. In some examples, operation 1010 can include process 1100 or operation(s) thereof. In this and other examples, computational model 1102 can be trained as a predictor, and context information 1104 internal to the predictor can be used in determining the feature vector. In some examples, at least one of the training data streams comprises a plurality of bit strings of a common length, e.g., a plurality of individual bits, bytes (8-bit units), words (16-bit units), dwords (32-bit units), or other units.

In some examples, the computational model 1102 is configured to take as input a model input 1106, e.g., a training model input 1008 or value derived therefrom. In some examples of a series predictor, a training model input 1008 comprises or consists of a plurality of bit strings, and the computational model 1102 sequentially receives individual bit strings of the plurality of bit strings as the model inputs. This is graphically indicated by the "Next Bit String" connector in FIG. 11. The computational model 1102 is configured to provide as output a model output 1108 associated with the model input, e.g., with at least one model input or with all model inputs. The computational model 1102 is also configured to provide as output the feature vector 1110, as discussed above. In some examples, each individual bit string can be analyzed in the context of a sliding window of nearby bit strings in the training model input 1008. The window can include, e.g., fewer than all the bit strings of the training model input 1008. Examples are discussed herein, e.g., with reference to FIG. 13.

In some examples, the training module 226 carries out operations of process 1100 to train the computational model 1102 as a sequence predictor. The training can be based on an evaluation function 1112 operative, for a training data stream of the training data streams 114, to penalize differences between an individual model output 1108 of the computational model and a corresponding reference bit sequence 1114 of the respective training data stream 114. For example, the reference bit sequence can be a subsequent byte of a training data stream 114 being predicted by computational model 1102 based at least in part on preceding byte(s) of the training data stream 114.

In some examples, at operation 1116, the training module 226 determines the model input 1106 and the reference bit sequence 1114 for a particular trial or training operation. For example, the training module 226 can determine the model input 1106 as a current bit string of a training model input 1008 and the reference bit sequence 1114 as a next bit string of the training model input 1008.

In some examples, at operation 1118, the training module 226 operates the computational model 1102 based at least in part on the model input 1106. Examples are discussed herein, e.g., with reference to operation 320.

In some examples, at operation 1120, the training module 226 applies evaluation function 1112 to the model output 1108. Operation 1120 can include, e.g., comparing the model output 1108 with the reference bit sequence 1114. Examples are discussed herein, e.g., with reference to operation 618.

In some examples, at operation 1122, the training module 226 updates the context information 1104 of the computational model 1102. This update can be based on the individual bit strings, e.g., model inputs 1106, either directly or via the computational model 1102 and model output 1108. Updating the context information 1104 can increase the accuracy of prediction of computational model 1102. Consequently, updating the context information 1104 can cause the context information 1104 to more accurately reflect characteristics of the input sequence, e.g., the training model input 1008. Therefore, at least some of the context information 1104 can be included in the feature vector 1110, or the feature vector 1110 can consist of the context information 1104, so that the feature vector 1110 will reflect characteristics of the input sequence.

Figure 12:
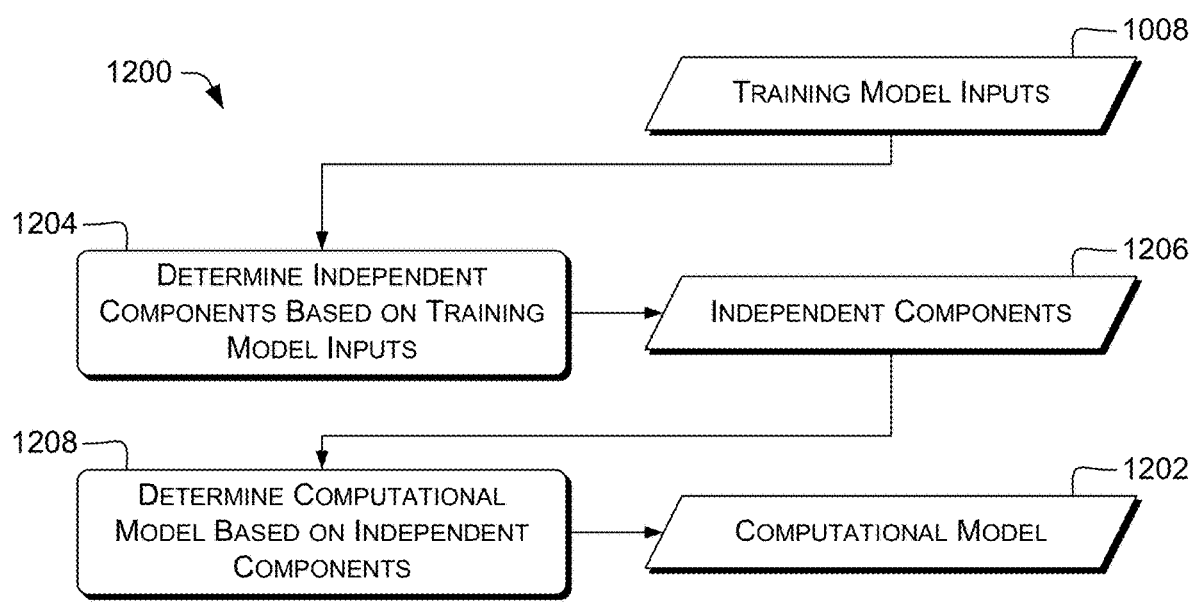
FIG. 12 is a dataflow diagram that illustrates example processes for determining computational model(s) that analyze independent components according to various examples described herein.

FIG. 12 is a dataflow diagram that shows an example process 1200 for training computational models, shown as computational model 1202, and example data items. In some examples, operation 1010 can include operations of process 1200.

In some examples, at operation 1204, the training module 226 determines a plurality of independent components 1206 based at least in part on the training model inputs 1008. For example, the training module 226 can use an algorithm of the minimization-of-mutual-information type or the non-Gaussianity-maximization type. The latter type can be based on, e.g., maximization of kurtosis or of negentropy. Maximization of negentropy can provide increased robustness to outliers compared to maximization of kurtosis. Example algorithms useful in operation 1204 can include projection pursuit, infomax-based joint-entropy maximization, maximum likelihood estimation, or other algorithms for determining, for a training model input 1008, independent component signals and respective weights so that the weighted sum of the component signals approximates that training model input 1008.

In some examples, at operation 1208, the training module 226 determines the computational model 1202 configured to provide the feature vector indicating relative contributions to the model input of the independent components 1206. For example, the training module 226 can determine the computational model 1202 including an unmixing matrix that is the inverse or pseudoinverse of a matrix comprising the independent components.

In some examples, the training module 226 can determine the computational model 1202 that projects the its inputs into a different linear subspace. For example, the training module 226 can perform principal components analysis (PCA) of the training model inputs 1008, e.g., using a singular value decomposition (SVD) to determine the basis vectors of the subspace. The training module 226 can then determine the computational model 1202 (or, e.g., 220) comprising or consisting of a matrix or other mathematical transformation that projects an individual trial model input 318 into the determined subspace. The trial feature vector 322 can then include or consist of the coordinates of the projected trial model input 318 in the subspace.

Figure 13:
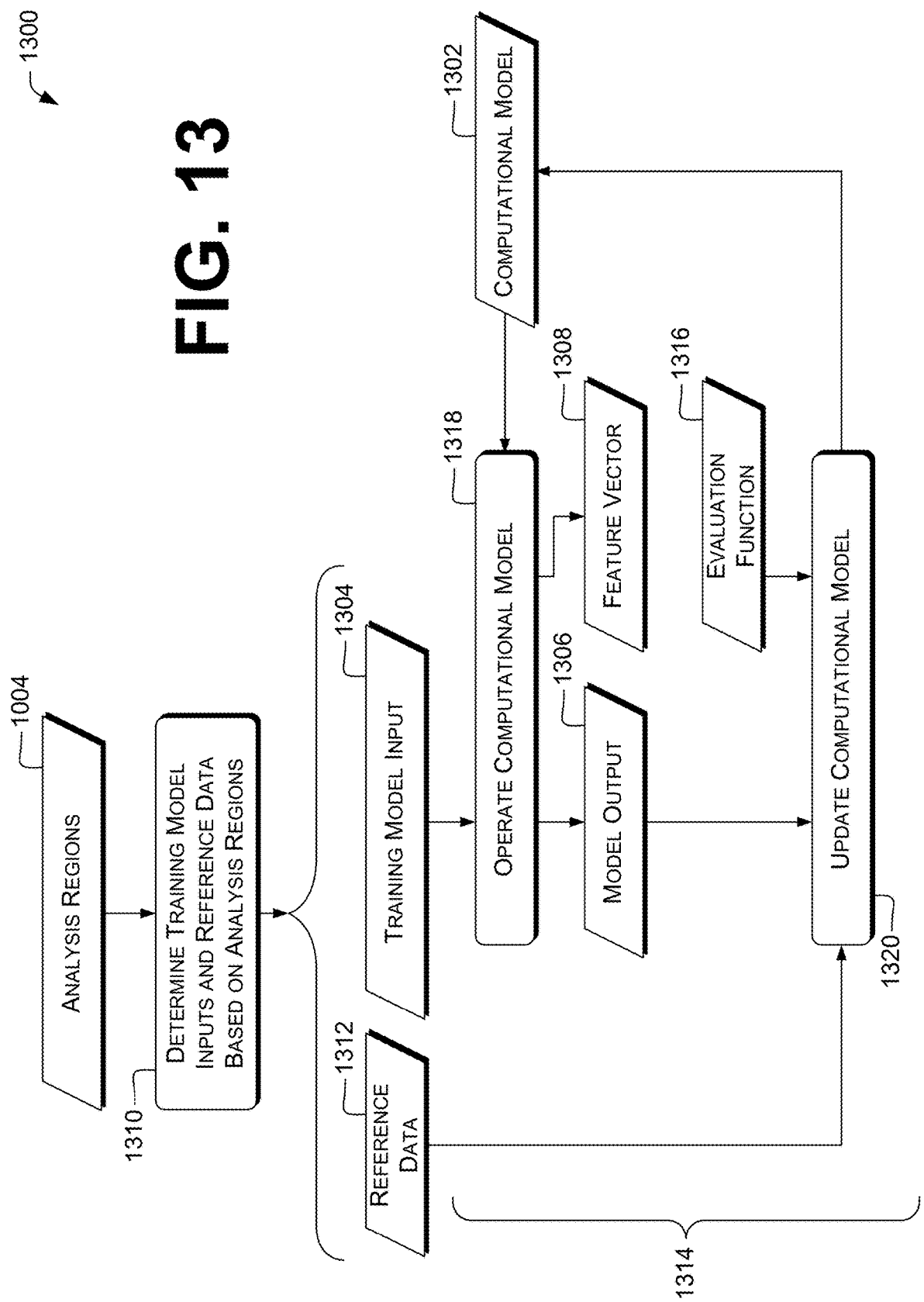
FIG. 13 is a dataflow diagram that illustrates example processes for determining computational model(s) trained as predictors according to various examples described herein.

FIG. 13 is a dataflow diagram that shows an example process 1300 for training computational models, shown as computational model 1302, and example data items. In some examples, e.g., as discussed above with reference to FIG. 6 or 11, the computational model 1302 is configured to take a training model input 1304 and provide a model output 1306 and a feature vector 1308 associated with the training model input 1304. Training model input 1304 can additionally or alternatively represent a trial model input such as model input 710, omitted for brevity.

In some examples, at operation 1310, the training module 226 determines one or more respective training model inputs 1304 associated with the respective analysis regions of the analysis regions 1004. The training module 226 also determines respective reference data 1312 associated with the respective training model inputs 1304. For example, at least one of a training model input 1304 or reference data 1312 can comprise or consist of a sequence of bit strings (e.g., bytes), words or other content items, or other values. In some examples, an individual training model input 1304 comprises or consists of at least one value in the respective analysis region 1004, and the respective reference data 1312 comprises or consists of a subsequent or intermediate value in the respective analysis region 1004. In some examples, an individual training model input 1304 comprises or consists of at least one value in the respective analysis region 1004, and the respective predetermined portion comprises or consists of at least one preceding or subsequent value in the stream representation.

In some examples, at operation 1314, the training module 226 trains the computational model 1302 as a predictor based at least in part on the training model inputs 1304 and an evaluation function 1316. The evaluation function 1316 penalizes a difference between an individual model output 1306 and at least a portion of the respective reference data 1312. This can be done, e.g., using Continuous Bag-of-Words (CBOW) or Continuous Skip-gram training. The evaluation function 1316 can be applied for a plurality of training model inputs 1304 to evaluate differences between respective model outputs 1306 and respective reference data 1312. Operation 1314 can include operating computational model 1302, at operation 1318, to determine model output 1306, and updating computational model 1302, at operation 1320, based at least in part on the model output 1306, the reference data 1312, and the evaluation function 1316.

In some examples of CBOW, a model output 1306 corresponds to a value at a predetermined position in a training data stream 114, e.g., a prediction of byte i of an n-byte analysis region 1004. The respective training model input 1304 comprises at least one byte from bytes 1 . . . (i−1) or (i+1) . . . n. The reference data 1312 is the actual byte i of the analysis region 1004. The evaluation function 1316 penalizes differences between the actual value of byte i and the prediction of the value of byte i determined by computational model 1302 based on other bytes of the analysis region 1004. At operation 1320, the training module 226 updates parameter(s) of the computational model 1302 to improve its prediction accuracy. The parameter(s) can include, e.g., a respective feature vector 1308 for each value of training model input 1304.

In some examples of skip-gram training, a training model input 1304 corresponds to a value at a predetermined position in a training data stream 114, e.g., the value of byte i of an n-byte analysis region 1004. The respective model output 1306 comprises at least one byte from bytes 1 . . . (i−1) or (i+1) . . . n. The evaluation function 1316 penalizes differences between the actual value(s) of bytes 1 . . . (i−1) or (i+1) . . . n and the prediction(s) of the value(s) of those byte(s) determined by computational model 1302. The evaluation function 1316 can be used as described above with reference to CBOW, but for different byte offsets.

Example Clauses

A: A method comprising performing the following operations using at least one processor: locating respective training analysis regions of individual training data streams of a plurality of training data streams based at least in part on predetermined structure data, wherein each respective training analysis region comprises a predetermined number of bits; determining respective training model inputs based at least in part on the training analysis regions, wherein each respective training model input comprises a first number of values; determining a computational model based at least in part on the training model inputs, wherein: the computational model is configured to receive as input an input vector comprising the first number of values and to provide as output an output vector approximating the input vector and a feature vector comprising a second number of values; and the second number of values is less than the first number of values; locating a trial analysis region of a trial data stream based at least in part on the predetermined structure data, wherein the trial analysis region comprises the predetermined number of bits; determining a trial model input based at least in part on the trial analysis region, wherein the trial model input comprises the first number of values; and operating the computational model based at least in part on the trial model input to provide a trial feature vector comprising the second number of values.

B: The method according to paragraph A, further comprising operating a second computational model based at least in part on the trial feature vector to determine whether the trial data stream is associated with malware.

C: The method according to paragraph A or B, wherein at least one individual training data stream comprises at least part of an executable file.

D: The method according to paragraph C, wherein: the predetermined structure data comprises a location chain that associates the executable file with an entry point; and the respective training analysis region of the at least one individual training data stream commences at the entry point.

E: The method according to any of paragraphs A-D, wherein: the predetermined structure data comprises data of a location chain; the method further comprises applying the location chain to the individual training data streams to determine respective bit offset values; and the respective training analysis regions comprise respective portions, commencing at the respective bit offset values and extending for the first bit length, of the respective training data streams.

F: The method according to any of paragraphs A-E, wherein: the computational model comprises an autoencoder; and the operations further comprise: modifying at least some bits of at least some of the training analysis regions to provide the respective training model inputs; and determining parameter values of the computational model based at least in part on an evaluation function penalizing differences between the output vectors and the respective training model inputs.

G: The method according to any of paragraphs A-F, wherein the predetermined structure data comprises data identifying the number of bits.

H: The method according to any of paragraphs A-G, wherein the individual training data streams and the trial data stream comprise the partial or full contents of respective digital files.

I: The method according to any of paragraphs A-H, wherein the operations further comprise converting an analog data stream to a digital format to provide at least one of: the trial data stream, or at least one training data stream of the plurality of training data streams.

J: The method according to any of paragraphs A-I, wherein the predetermined structure data comprises computer-executable instructions that, when executed by the at least one processor, operate on at least one of the individual training data streams to determine the respective training analysis region(s).

K: The method according to any of paragraphs A-J, wherein: the predetermined structure data comprises a bit offset; and the respective training analysis regions comprise respective portions, commencing at the bit offset and extending for the predetermined number of bits, of the respective training data streams.

L: An apparatus, comprising: at least one processor; and a computer-readable medium including instructions to, when executed by the at least one processor, cause the at least one processor to perform operations comprising: locating an analysis region of a data stream based at least in part on predetermined structure data, wherein the analysis region comprises a predetermined number of bits; determining a model input based at least in part on the analysis region; and operating a computational model using the model input to provide a model output associated with the data stream.

M: The apparatus according to paragraph L, further comprising a communications interface, the operations further comprising: receiving the data stream via the communications interface; and transmitting an indication of the model output via the communications interface.

N: The apparatus according to paragraph L or M, the operations further comprising: operating a second computational model based at least in part on the model output to provide a second model output indicating whether the data stream is associated with malware.

O: The apparatus according to paragraph N, further comprising a communications interface, the operations further comprising: transmitting an indication of the second model output via the communications interface.

P: The apparatus according to any of paragraphs L-O, wherein: the predetermined structure data comprises data of a location chain; the location chain comprises at least one of: an initial offset; a pointer location; or an instruction to access an offset located at a current offset in the data stream; and the operations further comprise: applying the location chain to the data stream to determine a result bit offset; and locating the analysis region beginning at the result bit offset in the data stream.

Q: The apparatus according to any of paragraphs L-P, the operations further comprising encoding at least some data of the analysis region into a one-hot encoding to provide the model input.

R: The apparatus according to any of paragraphs L-Q, wherein the data stream comprises at least part of an executable file and the analysis region comprises at least some computer-executable instructions of the executable file.

S: The apparatus according to any of paragraphs L-R, the operations further comprising: modifying the computational model based at least in part on the model input to provide a modified computational model having at least one parameter; training the modified computational model as a predictor, the training comprising updating the at least one parameter; and subsequently, determining the model output based at least in part on the at least one parameter.

T: The apparatus according to any of paragraphs L-S, wherein the model output comprises fewer values than does the model input.

U: The apparatus according to any of paragraphs L-T, wherein the predetermined structure data comprises data of an offset of the training analysis region within the respective training data stream.

V: The apparatus according to any of paragraphs L-U, the operations for operating the computational model comprising: providing the model input as input to a neural network (NN) comprising a hidden layer; propagating values through the NN to the hidden layer; and determining the model output based at least in part on output(s) of the hidden layer.

W: The apparatus according to any of paragraphs L-V, wherein the operations further comprise: repeating the locating, determining, and operating with respect to a second data stream to determine a second model output associated with the second data stream; and determining a similarity value between the model output and the second model output.

X: A method comprising performing the following operations using at least one processor: locating respective analysis regions of individual training data streams of a plurality of training data streams based at least in part on predetermined structure data; determining respective training model inputs based at least in part on the respective analysis regions, wherein each respective training model input comprises a first number of values; determining a computational model based at least in part on the training model inputs, wherein: the computational model is configured to receive as input a model input comprising the first number of values and to provide as output a feature vector comprising a second number of values (e.g., different from the first number of values).

Y: The method according to paragraph X, wherein: the computational model is further configured to provide as output a model output comprising the first number of values; and the operations further comprise training the computational model as an autoencoder based at least in part on an evaluation function that penalizes differences between the training input and the model output.

Z: The method according to paragraph Y, wherein the operations further comprise determining at least one of the training model inputs as a one-hot representation of the respective analysis region.

AA: The method according to paragraph Y or Z, wherein the operations further comprise determining at least one of the training model inputs as a bag-of-values representation of the respective analysis region.

AB: The method according to any of paragraphs Y-AA, wherein the autoencoder is a denoising autoencoder.

AC: The method according to any of paragraphs Y-AB, wherein the computational model comprises: a first layer array configured to produce the feature vector based at least in part on the input vector; and a second layer array configured to produce the model output based at least in part on the feature vector.

AD: The method according to any of paragraphs X-AC, wherein: the computational model comprises a neural network (NN); the NN comprises at least one hidden layer; and the feature vector comprises at least one output of the at least one hidden layer.

AE: The method according to any of paragraphs X-AD, wherein: at least one of the training data streams comprises a plurality of bit strings of a common length; the computational model is configured to: further provide as output a model output associated with the model input; sequentially receive individual bit strings of the plurality of bit strings as the model inputs; and update context information of the computational model based on the individual bit strings; the feature vector comprises at least some of the context information; and the operations further comprise training the computational model as a sequence predictor based on an evaluation function operative, for a training data stream of the training data streams, to penalize differences between an individual model output of the computational model and a corresponding reference bit sequence of the respective training data stream.

AF: The method according to any of paragraphs X-AE, wherein the operations further comprise: determining a plurality of independent components based at least in part on the training model inputs; and determining the computational model configured to provide the feature vector indicating relative contributions to the model input of the independent components.

AG: The method according to any of paragraphs X-AF, wherein: the computational model is further configured to provide a model output associated with the model input; and the operations further comprise: determining, for individual ones of the analysis regions, the respective training model inputs and respective reference data; and training the computational model as a predictor based at least in part on: the training model inputs; and an evaluation function penalizing differences between an individual model output of the computational model, wherein the individual model output is associated with an individual training model input of the training model inputs, and the reference data associated with the individual training model input.

AH: The method according to any of paragraphs X-AG, wherein the second number of values is less than the first number of values.

AI: A computer-readable medium, e.g., a computer storage medium, having thereon computer-executable instructions, the computer-executable instructions upon execution configuring a computer to perform operations as any of paragraphs A-AH (e.g., A-K, L-W, or X-AH) recites.

AJ: A device comprising: a processor; and a computer-readable medium, e.g., a computer storage medium, having thereon computer-executable instructions, the computer-executable instructions upon execution by the processor configuring the device to perform operations as any of paragraphs A-AH (e.g., A-K, L-W, or X-AH) recites.

AK: A system comprising: means for processing; and means for storing having thereon computer-executable instructions, the computer-executable instructions including means to configure the system to carry out a method as any of paragraphs A-AH (e.g., A-K, L-W, or X-AH) recites.

CONCLUSION AND FURTHER ILLUSTRATIVE VARIANTS

Various computational-model determination and operation techniques described herein can permit more efficiently analyzing data, e.g., of a data stream, and more readily determining a signature or classification of the data stream. Various examples can reduce the time or memory requirements of software to determine signatures while maintaining or improving the accuracy of such determinations. Some examples herein permit classifying data streams produced by unknown generators, which may be, e.g., malware generated using a custom packer specific to that type of malware or the relevant adversary. Some examples permit classifying data streams even when few samples of a particular generator's output are available, e.g., a single sample or fewer than ten samples. Some examples provide signatures that can then be used by neural networks or other classifiers in determining classifications of unknown files. Some examples are described with reference to malware, but techniques described herein are not limited to files associated with malware. For example, techniques used herein can be used to classify media files (e.g., audio, video, or image); productivity files (e.g., text documents or spreadsheets); data files (e.g., database indexes or tables); or other types of files.

Various examples herein can be used with a variety of generators, which can include, but are not limited to, those listed in Table 3. The category "content protection" in Table 3 can include, but is not limited to, copy-protection or data-encryption tools. Example trial data streams 116 that can be analyzed using computational models 112 as described herein include, but are not limited to, PE, ELF, Mach-O, JAR, or DEX executables, or any other executable formats; PNG, GIF, or other image formats; OGG, MP3, MP4, Matroska, or other audio or video container or bitstream formats; or traces of network traffic, e.g., headers or bodies of data packets in protocols such as IEEE 802.11, IP, UDP, or TCP. Example types of trial data streams 116 that can be analyzed using computational models 112 as described herein include, but are not limited to, executables, static libraries, dynamic libraries, data files, compressed files, encrypted files, or obfuscated files. Note that the categories listed in Table 3 are for ease of understanding and are not limiting, as some listed generators include functions from more than one category. Various examples permit distinguishing between subtypes within a category, e.g., different versions or feature sets of a particular generator.

TABLE 3

| Category | Example Generators |
| --- | --- |
| Compiler or Linker | gcc (for various targets, including Hurd, GNU/LINUX, cygwin, or mingw), C++BUILDER, DELPHI, TURBO PASCAL, MICROSOFT VISUAL STUDIO, PUREBASIC |
| Distribution-package assembler | Java Archiver (jar), Dalvik Executable tool (dx) |
| Script packager | py2exe, cx_freeze, PAR::Packer |
| Installer | NULLSOFT Install System (NSIS); MICROSOFT WINDOWS Installer or Updater (for MSI/MSU packages) |
| Packer | General packers (e.g., UPX, ExE Pack, Armadillo, ASpack); demoscene packers (e.g., kkrunchy, crinkler); custom packers, including those designed by adversaries for use in their malware |
| Self-extractor | ARC-SFX, PAK-SFX, WinRAR-SFX, PKZIP-SFX, 7zip-SFX |
| Content protection | SoftProtect, EXECryptor, VMProtect |

Although the techniques have been described in language specific to structural features and/or methodological acts, it is to be understood that the appended claims are not necessarily limited to the features and/or acts described. Rather, the features and acts are described as example implementations of such techniques. For example, network 108, processing unit(s) 210, and other structures described herein for which multiple types of implementing devices or structures are listed can include any of the listed types, and/or multiples and/or combinations thereof.

The operations of the example processes are illustrated in individual operations and summarized with reference to those operations. The processes are illustrated as logical flows of operations, each operation of which can represent one or more operations that can be implemented in hardware, software, and/or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions and/or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 102, 104, and/or 200 such as one or more internal and/or external CPUs and/or GPUs, and/or one or more pieces of hardware logic such as FPGAs, DSPs, and/or other types described above.

All of the methods and processes described above can be embodied in, and fully automated via, software code modules executed by one or more computers and/or processors. The code modules can be embodied in any type of computer-readable medium. Some and/or all of the methods can be embodied in specialized computer hardware. As used herein, the term "module" is intended to represent example divisions of the described operations (e.g., implemented in software or hardware) for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions and modules are described herein as being implemented by software and/or firmware executable on a processor, in other embodiments, any or all of the modules may be implemented in whole or in part by hardware (e.g., as an ASIC, a specialized processing unit, etc.) to execute the described functions. In some instances, the functionality and/or modules discussed herein may be implemented as part of the operating system 216. In other instances, the functionality and/or modules may be implemented as part of a device driver, firmware, and so on.

The word "or" and the phrase "and/or" are used herein in an inclusive sense unless specifically stated otherwise. Accordingly, conjunctive language such as the phrases "X, Y, or Z," "at least X, Y, or Z," or "at least one of X, Y or Z," unless specifically stated otherwise, is to be understood as signifying that an item, term, etc., can be either X, Y, or Z, or a combination thereof. Conditional language such as, among others, "can," "could," "might" and/or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples and/or that one or more examples necessarily include logic for deciding, with and/or without user input and/or prompting, whether certain features, elements and/or steps are included and/or are to be performed in any particular example.

Any routine descriptions, elements and/or blocks in the flow diagrams described herein and/or depicted in the attached figures should be understood as potentially representing modules, segments, and/or portions of code that include one or more computer-executable instructions for implementing specific logical functions and/or elements in the routine. Alternative implementations are included within the scope of the examples described herein in which elements and/or functions can be deleted and/or executed out of order from any order shown or discussed, including substantially synchronously and/or in reverse order, depending on the functionality involved as would be understood by those skilled in the art. Examples herein are nonlimiting unless expressly stated otherwise, regardless of whether or not they are explicitly described as being nonlimiting. It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise.

What is claimed is:

1. A method comprising performing the following operations using at least one processor:
    locating respective training analysis regions of individual training data streams of a plurality of training data streams based at least in part on predetermined structure data, wherein each respective training analysis region comprises a predetermined number of bits;
    determining respective training model inputs based at least in part on the training analysis regions, wherein each respective training model input comprises a first number of values;
    determining a computational model based at least in part on the training model inputs, wherein:
        the computational model is configured to receive as input an input vector comprising the first number of values and to provide as output an output vector approximating the input vector and a feature vector comprising a second number of values; and
        the second number of values is less than the first number of values;
    locating a trial analysis region of a trial data stream based at least in part on the predetermined structure data, wherein the trial analysis region comprises the predetermined number of bits;
    determining a trial model input based at least in part on the trial analysis region, wherein the trial model input comprises the first number of values; and
    operating the computational model based at least in part on the trial model input to provide a trial feature vector comprising the second number of values.

2. The method according to claim 1, further comprising operating a second computational model based at least in part on the trial feature vector to determine whether the trial data stream is associated with malware.

3. The method according to claim 1, wherein at least one individual training data stream comprises at least part of an executable file.

4. The method according to claim 1, wherein:
    the predetermined structure data comprises data of a location chain;
    the method further comprises applying the location chain to the individual training data streams to determine respective bit offset values; and
    the respective training analysis regions comprise respective portions, commencing at the respective bit offset values and extending for the first bit length, of the respective training data streams.

5. The method according to claim 1, wherein:
    the computational model comprises an autoencoder; and
    the operations further comprise:
        modifying at least some bits of at least some of the training analysis regions to provide the respective training model inputs; and
        determining parameter values of the computational model based at least in part on an evaluation function penalizing differences between the output vectors and the respective training model inputs.

6. An apparatus, comprising:
    at least one processor; and
    a computer-readable medium including instructions to, when executed by the at least one processor, cause the at least one processor to perform operations comprising:
        locating an analysis region of a data stream based at least in part on predetermined structure data, wherein the analysis region comprises a predetermined number of bits;
        determining a trial model input based at least in part on the analysis region, the trial model input comprising a first number of values;
        determining a trial feature vector comprising a second number of values by operating a computational model based at least in part on the trial model input, the second number of values being less than a one-hot encoding of the first number of values; and
        providing the trial feature vector as a model output associated with the data stream.

7. The apparatus according to claim 6, further comprising a communications interface, the operations further comprising:
    receiving the data stream via the communications interface; and
    transmitting an indication of the model output via the communications interface.

8. The apparatus according to claim 6, the operations further comprising:
    operating a second computational model based at least in part on the model output to provide a second model output indicating whether the data stream is associated with malware.

9. The apparatus according to claim 6, wherein:
    the predetermined structure data comprises data of a location chain;
    the location chain comprises at least one of: an initial offset; a pointer location; or
    an instruction to access an offset located at a current offset in the data stream; and
    the operations further comprise:
        applying the location chain to the data stream to determine a result bit offset; and
        locating the analysis region beginning at the result bit offset in the data stream.

10. The apparatus according to claim 6, the operations further comprising encoding at least some data of the analysis region into a one-hot encoding to provide the model input.

11. The apparatus according to claim 6, wherein the data stream comprises at least part of an executable file and the analysis region comprises at least some computer-executable instructions of the executable file.

12. The apparatus according to claim 6, the operations further comprising:
    modifying the computational model based at least in part on the trial model input to provide a modified computational model having at least one parameter;
    training the modified computational model as a predictor, the training comprising updating the at least one parameter; and
    subsequently, determining the model output based at least in part on the at least one parameter.

13. A method comprising performing the following operations using at least one processor:
    locating respective analysis regions of individual training data streams of a plurality of training data streams based at least in part on predetermined structure data;
    determining respective training model inputs based at least in part on the respective analysis regions, wherein each respective training model input comprises a first number of values; and determining a computational model based at least in part on the training model inputs,
wherein:
the computational model is configured to receive as input an input vector comprising the first number of values and to provide as output a feature vector comprising a second number of values that is less than a one-hot encoding of the first number of values, the feature vector approximating the input vector.

14. The method according to claim 13, wherein:
the computational model is further configured to provide as output a model output comprising the first number of values; and
the operations further comprise training the computational model as an autoencoder based at least in part on an evaluation function that penalizes differences between the training model input and the model output.

15. The method according to claim 14, wherein the operations further comprise determining at least one of the training model inputs as a one-hot representation of the respective analysis region.

16. The method according to claim 14, wherein the operations further comprise determining at least one of the training model inputs as a bag-of-values representation of the respective analysis region.

17. The method according to claim 13, wherein:
the computational model comprises a neural network (NN);
the NN comprises at least one hidden layer; and
the feature vector comprises at least one output of the at least one hidden layer.

18. The method according to claim 13, wherein:
at least one of the training data streams comprises a plurality of bit strings of a common length;
the computational model is configured to:
  further provide as output a model output associated with the training model input;
  sequentially receive individual bit strings of the plurality of bit strings as the training model inputs; and
  update context information of the computational model based on the individual bit strings;
the feature vector comprises at least some of the context information; and
the operations further comprise training the computational model as a sequence predictor based on an evaluation function operative, for a training data stream of the training data streams, to penalize differences between an individual model output of the computational model and a corresponding reference bit sequence of the respective training data stream.

19. The method according to claim 13, wherein the operations further comprise:
determining a plurality of independent components based at least in part on the training model inputs; and
determining the computational model configured to provide the feature vector indicating relative contributions to the training model input of the independent components.

20. The method according to claim 13, wherein:
the computational model is further configured to provide a model output associated with the training model input; and
the operations further comprise:
determining, for individual ones of the analysis regions, the respective training model inputs and respective reference data; and
training the computational model as a predictor based at least in part on:
  the training model inputs; and
  an evaluation function penalizing differences between an individual model output of the computational model, wherein the individual model output is associated with an individual training model input of the training model inputs, and the reference data associated with the individual training model input.

* * * * *